United States Patent
Herzog et al.

(10) Patent No.: US 7,409,852 B2
(45) Date of Patent: Aug. 12, 2008

(54) SYSTEM AND METHOD FOR TESTING FUEL TANK INTEGRITY

(75) Inventors: Michael Herzog, Tucson, AZ (US); Gordon Ernest Smith, Sandy, UT (US); Charles Michael Sulik, Tucson, AZ (US); Arun Raj Pandey, Tucson, AZ (US); Valeriy Maksimovich Shishkin, Tucson, AZ (US); Rex Graham Weedon, Tucson, AZ (US); Mark A. Davis, Tucson, AZ (US)

(73) Assignee: Environmental Systems Products Holdings Inc., East Granby, CT (US)

( * ) Notice: Subject to any disclaimer, the term of this patent is extended or adjusted under 35 U.S.C. 154(b) by 0 days.

(21) Appl. No.: 11/546,300

(22) Filed: Oct. 12, 2006

(65) Prior Publication Data

US 2007/0033987 A1 Feb. 15, 2007

Related U.S. Application Data

(62) Division of application No. 10/974,677, filed on Oct. 28, 2004, now Pat. No. 7,168,297.

(60) Provisional application No. 60/514,745, filed on Oct. 28, 2003.

(51) Int. Cl.
*G01M 3/04* (2006.01)
(52) U.S. Cl. .................................................. 73/49.2
(58) Field of Classification Search ............... 73/49.2
See application file for complete search history.

(56) References Cited

U.S. PATENT DOCUMENTS

| | | | |
|---|---|---|---|
| 4,576,299 A | 3/1986 | Lecinski, Jr. | |
| 4,770,028 A | 9/1988 | Flippo, Jr. | |
| 4,773,256 A | 9/1988 | Saulgeot | |
| 4,776,206 A | 10/1988 | Armstrong et al. | |
| 4,790,449 A | 12/1988 | Kyokuichi et al. | |
| 4,791,805 A | 12/1988 | Gates | |
| 4,845,360 A | 7/1989 | Landfors | |
| 4,862,731 A | 9/1989 | Gates | |
| 4,876,530 A | 10/1989 | Hill et al. | |
| 4,984,450 A | 1/1991 | Burger | |
| 5,091,716 A | 2/1992 | Nelson et al. | |
| 5,158,054 A | 10/1992 | Otsuka | |
| 5,226,314 A | 7/1993 | Baret | |
| 5,239,858 A | 8/1993 | Rogers et al. | |
| 5,297,422 A | 3/1994 | Baret | |
| 5,323,640 A | 6/1994 | Porcaro et al. | |

(Continued)

OTHER PUBLICATIONS

California Bureau of Automotive Repair (BAR) Performance Specifications for Request for Proposals for Low Pressure Fuel Evaporative Pressure Tester, Dec. 2002, 17 pages.

*Primary Examiner*—Hezron Williams
*Assistant Examiner*—Rodney Frank
(74) *Attorney, Agent, or Firm*—Pillsbury Winthrop Shaw Pittman, LLP

(57) ABSTRACT

The invention relates generally to a system and method for testing fuel evaporative systems, and more particularly to a stand-alone tank tester system (and method) for testing vehicle fuel tank integrity. Furthermore, a self-contained calibration tank with switchable leak sizes for calibrating the tank tester to multiple leak sizes is provided. Constant flow and vacuum methods for testing fuel tank integrity are also provided.

1 Claim, 13 Drawing Sheets

U.S. PATENT DOCUMENTS

| | | |
|---|---|---|
| 5,369,976 A | 12/1994 | Ratton |
| 5,369,984 A | 12/1994 | Rogers et al. |
| 5,390,645 A | 2/1995 | Cook et al. |
| 5,419,299 A | 5/1995 | Fukasawa et al. |
| 5,425,266 A | 6/1995 | Fournier |
| 5,465,614 A | 11/1995 | Fournier |
| 5,467,641 A | 11/1995 | Williams et al. |
| 5,507,176 A | 4/1996 | Kammeraad et al. |
| 5,509,296 A | 4/1996 | Kolb |
| 5,606,121 A | 2/1997 | Blomquist et al. |
| 5,644,072 A | 7/1997 | Chirco et al. |
| 5,675,073 A | 10/1997 | Otsuka |
| 5,681,983 A | 10/1997 | Seigeot |
| 5,706,967 A | 1/1998 | Weh et al. |
| 5,715,786 A | 2/1998 | Seiberth |
| 5,756,882 A | 5/1998 | Cranfill et al. |
| 5,763,764 A | 6/1998 | Mieczkowski et al. |
| 5,831,147 A | 11/1998 | Hoath |
| 5,898,108 A | 4/1999 | Mieczkowski et al. |
| 5,952,559 A | 9/1999 | Harris et al. |
| 5,996,402 A | 12/1999 | Harris |
| 6,014,892 A | 1/2000 | Baret et al. |
| 6,016,792 A | 1/2000 | Kawano et al. |
| D432,932 S | 10/2000 | Evans et al. |
| 6,164,123 A | 12/2000 | Corkill |
| 6,230,549 B1 | 5/2001 | Harris |
| 6,257,050 B1 | 7/2001 | Nagano et al. |
| 6,276,193 B1 | 8/2001 | Benjey |
| 6,276,344 B1 | 8/2001 | Isobe et al. |
| 6,283,098 B1 | 9/2001 | Corkill |
| 6,289,722 B1 | 9/2001 | Lycan et al. |
| 6,289,915 B1 | 9/2001 | Nulman et al. |
| 6,298,712 B1 | 10/2001 | Docy et al. |
| 6,301,955 B1 | 10/2001 | Cook et al. |
| 6,311,548 B1 | 11/2001 | Breidenbach et al. |
| 6,321,727 B1 | 11/2001 | Reddy et al. |
| 6,327,898 B1 | 12/2001 | Harris |
| 6,338,414 B1 | 1/2002 | Schellenbach |
| 6,354,141 B1 | 3/2002 | Pierrejean et al. |
| RE37,676 E | 4/2002 | Abrams et al. |
| 6,367,458 B1 | 4/2002 | Furusho et al. |
| 6,374,663 B1 | 4/2002 | Muller et al. |
| 6,463,915 B2 | 10/2002 | Ozaki et al. |
| 6,550,313 B1 | 4/2003 | Flosbach |
| 6,561,009 B1 | 5/2003 | Perry et al. |
| 6,571,778 B2 | 6/2003 | Herm et al. |
| 6,594,562 B2 | 7/2003 | Kaiser et al. |
| 6,604,407 B2 | 8/2003 | Kano et al. |
| 6,626,157 B2 | 9/2003 | Perry |
| 6,701,777 B2 | 3/2004 | Yamaguchi et al. |
| 6,761,058 B2 | 7/2004 | Yamaguchi et al. |
| 6,807,847 B2 | 10/2004 | Steckler et al. |
| 6,832,509 B2 | 12/2004 | Morinaga et al. |
| 6,840,089 B2 | 1/2005 | Docy et al. |
| 6,892,712 B2 | 5/2005 | Miwa et al. |
| 6,931,919 B2 | 8/2005 | Weldon |
| 6,951,126 B2 | 10/2005 | Perry et al. |
| 2002/0011094 A1 | 1/2002 | Cook et al. |
| 2003/0084711 A1 | 5/2003 | Kano et al. |
| 2003/0110836 A1 | 6/2003 | Cho |

SYSTEM AND METHOD FOR TESTING FUEL TANK INTEGRITY

CROSS-REFERENCE TO RELATED APPLICATIONS

This Application is a divisional of U.S. patent application Ser. No. 10/974,677, filed Oct. 28, 2004, now U.S. Pat. No. 7,168,297 which claims priority to U.S. Provisional Patent Application Ser. No. 60/514,745 filed Oct. 28, 2003, which is incorporated herein by reference in its entirety.

FIELD OF THE INVENTION

The invention relates generally to a system and method for testing fuel evaporative systems, and more particularly to a stand-alone tank tester system (and method) for testing vehicle fuel tank integrity.

BACKGROUND OF THE INVENTION

The loss of fuel from a vehicle fuel tank (and associated piping) through evaporation to the atmosphere may result in, among other things, undesirable hydrocarbon pollution.

Accordingly, many systems and methods have been developed to test the tank integrity of vehicle fuel systems, and to identify vehicles that fail to comply with promulgated regulations and mandated guidelines (regardless of whether they are on the federal, state, or local level).

Unfortunately, many existing fuel tank integrity testing systems can be expensive, cumbersome, and inconsistent. These and other drawbacks exist.

SUMMARY OF THE INVENTION

The invention solving these and other problems relates to a stand-alone tank tester system (and method) for testing vehicle fuel tank (or fuel system) integrity.

According to an embodiment of the invention, a system is provided for a tank tester. The tank tester may perform various processes for testing fuel tank integrity, measurement of fuel tank volume, measurement of fuel volume, measurement of vapor space, measurement of fuel temperature, or other tests. The tank tester may include a computer-implemented component ("computer component"), a testing component, a housing, a calibration tank, and/or other elements. In some embodiments, the tank tester may perform various calibration and self-test procedures which may be necessary for efficient and accurate execution of fuel tank tests.

Computer Component

In one embodiment of the invention, the tank tester may include a computer component. The computer component may include various software elements and computer hardware such as, for example, a processor board. The processor board may include a processor which may be or include, for instance, any of the Intel ×86 PC/AT microprocessors or compatible processors such as those available from Cyrix or AMD. The processor board may also include one or more analog inputs with A/D converters that interface with various sensors, one or more digital outputs to interface with one or more solenoids, and other elements. The processor board may also include one or more serial ports that may interface with additional equipment such as, for example, Emissions Inspection Systems (EIS) equipment, a modem, a real time clock, or other devices or elements. The processor board may also include one or more memory devices. The one or more memory devices may include flash erasable programmable read-only-memory (FEPROM), a hard disk, or other data suitable memory for data storage.

The computer component may also include a signal conditioning board operatively connected to the processor board. The signal conditioning board may, among other things, condition electrical signals into and out from any sensors. The signal conditioning board may include a DC/DC power supply. The signal conditioning board may also include a pressure switch control for releasing pressure from the testing component (described in detail below) upon the existence of a predetermined pressure within the testing component. The signal conditioning board may further include one or more solenoid drivers for operating one or more solenoids throughout the tank tester. One or more solenoids may be utilized to operate various elements of the testing component including switches, valves, or other elements.

The computer component may also include one or more sensors operatively connected to the processor board and/or the signal conditioning board. The one or more sensors may include pressure transducers, temperature sensors, or other sensors for operation of the tank tester.

The computer component may also include external memory operatively connected to the processor board. The external memory may include flash memory, a hard disk, or other suitable memory for storing run-time programs, vehicle databases, testing lookup tables, recent test results, or other data.

In one embodiment, the computer component may include or host an operating application. The operating application may include one or more software modules enabling the operation of, and user interaction with, the tank tester. The operating application may be based on any one of many computer programming languages such as, for example, C, C++, or other programming language.

The operating application may include software for fuel tank testing, inspection test procedures and criteria, security measures, utilities, ancillary modules, or other software. The features enabled may include, among other things, integrated calibration and self test procedures, outside ambient temperature measurement, internal tank tester pressure measurements, fuel tank pressure measurements, evaporative tests, constant flow determination of a tank leak, vapor space compensation, temperature compensation, Reid Vapor Pressure (RVP) compensation, vacuum tank integrity testing, hydrocarbon detection, constant pressure tank integrity testing, use of vapor temperature for determination of liquid fuel temperature, interface with an Emissions Inspections System (EIS), or other features. One or more of the modules comprising the operating application may be combined. For some purposes, not all modules may be necessary.

In one embodiment, the operating application may also include, or have access to, data look-up tables, and may use table calls for fuel tank vapor space calculations, pass/fail decisions, and/or other calculations and decisions. These tables may compensate for temperature and RVP when making the vapor space calculations, pass/fail determinations, or other calculations or decisions. In addition, the operating application may write test results and calibration test results to a record ("test record").

In one embodiment, the computer component may include an interface that enables one or more users to interact with the operating application. The interface may comprise a graphical user interface (GUI) presented to a user on a display device. A user may interact with the operating application and the GUI via a user input device.

The computer component may also include other elements for the operation of the tank tester. As would be apparent to one skilled in the art, other configurations for the computer component may exist.

Testing Component

In one embodiment of the invention, the tank tester may include a testing component. The testing component may include a pressurized gas source, various pressure transducers, pressure regulators, valves, orifices, pneumatic pluming elements, or other elements for performing the operations of the tank tester described herein.

In one embodiment, the pressurized gas source may contain or produce pressurized gas for use in the tank tester. The pressurized gas may comprise nitrogen, compressed air, or another gas. If the tank tester uses nitrogen as a pressurizing gas, then the nitrogen may be 98% pure. Other concentrations may be used. If the tank tester uses compressed air as a pressurizing gas, an air filter capable of removing harmful contaminants and moisture from the compressed air may be included. This filter may ensure that no contaminants enter the tank tester that could physically block any orifice, or chemically contaminate the internal components of the tester. The filter may be configured to filter down to 5-micron size particles.

The pressurized gas source may be pneumatically connected to the various pressure transducers, pressure regulators, valves, orifices, or other elements included in the testing component of the tank tester.

The testing element may also include an outlet hose. The outlet hose may interface with a tank adaptor at one of its ends. The tank adaptor may include any of a set of fuel filler neck adaptors ("tank adaptors") that provide connectivity to various vehicles.

According to an embodiment of the invention, the tank adaptor, outlet hose, and any pneumatic conduit or gasket materials may be comprised of material which may be pliable and impermeable to some or all gasoline constituents including, for instance, Methyl Tertiary Butyl Ether (MTBE), ethanol, and methanol. Material exhibiting these properties is known in the art. Furthermore, the tank adaptor, the outlet hose, and other elements within testing component may be fitted with quick disconnect couplers that facilitate easy and rapid connection and disconnection from the vehicle.

Housing and Calibration Tank

In some embodiments of the invention, the tank tester may include a housing that may enclose one or more components of the tank tester. In other embodiments of the invention, the housing may support one or more components of the tank tester. These components may be supported either internally within the housing, externally to the housing, or partially internal and partially external to the housing. In another embodiment, the housing may comprise a custom impact-resistant plastic enclosure with a carrying strap and/or handle.

In one embodiment of the invention, a calibration tank may be included with the tank tester. The calibration tank may form a predetermined volume that may be pressurized. In some embodiments, the calibration tank may be supported internally within the housing. In some embodiments, the housing itself (or part of the housing) may form the calibration tank. In one embodiment, the calibration tank may include a bladder (not otherwise illustrated). In some embodiments, the bladder may conform itself within the housing. In another embodiment, the housing and/or the calibration tank may include a blow-molded case (not otherwise illustrated) with a volume that may be pressurized. As discussed above, the case may be formed, machined, or molded to have any predetermined volume.

The volume of the calibration tank may comprise one gallon, two gallons, five gallons, ten gallons, or any other predetermined volume. In some embodiments, this volume may be adjustable. The calibration tank may serve as a component for performing various calibration procedures (described in detail below) enabling efficient and accurate operation of the tank tester.

Calibration

According to an embodiment of the invention, the tank tester may include a calibration module. The calibration module may enable calibration of the various elements of the tank tester. Calibration may include one or more of the following processes: self-test of inlet pressure, self-test of transducers, self-test of temperature sensors, sensor check/zero with pressure disconnected, sensor check/zero with pressure connected, system leak/decay check with no tank, tank volume check with no leak, passing tank calibration, failing tank calibration, or other process.

As mentioned above, the calibration module may utilize a calibration tank that contains a known, predetermined volume (or vapor space). In one embodiment, the calibration tank may include switchable calibrated leak standards. For example, the calibration tank may contain purposefully designed leaks of varying sizes, one or more of which may be used to simulate fuel tank leaks of differing degrees.

According to one embodiment, the calibration module may utilize an internal clock to determine when calibration is due. As an example, the calibration module may automatically lock out test procedures on the tank tester every 72 hours pending a successful completion of one or more calibration procedures. Other time intervals may be used.

According to an embodiment, the calibration module may perform a system test for the tank tester's overpressure function. This system test monitors the tank tester's ability to disable the tank tester in the event that over pressurization of a calibration tank or fuel tank occurs. The tank tester may be capable of resuming normal operation after the overpressure condition has been eliminated and the tank tester successfully completes the calibration procedure. For a failed overpressure test, the tank tester may prevent further testing for a predetermined period of time, but may allow subsequent attempts to successfully complete calibration procedures, self-tests, or system tests.

Upon successful completion of a calibration procedure, the calibration module may write the results to a calibration record with the date and time. The calibration module may then start a clock to time-out the next calibration due date and time according to a predetermined time period. The new record may be recorded to the calibration record. The data recorded in the calibration record (regardless of failure or passage) may include Station ID (facility conducting test), Tester ID (person conducting test), Calibration ID (the specific calibration iteration), Date/Time of Calibration, Software Version, Pressure Decay Results, Vapor Space Results, Simulated Test Results, Overall Calibration Result, Calibration Error, Date/Time of Next Calibration Due, or other data. To calculate the next time due, the software may add the predetermined time period to the current calibration date and time. Once calibration has been successfully completed, the calibration module may allow testing to occur.

If the tank tester fails any portion of a calibration test, a user may be prompted to perform subsequent calibration procedures or contact a designated service provider for repairs.

According to one embodiment, when service of the tank tester is required, the tank tester may not allow further tank testing or manual mode pressurization to be performed until full function has been restored by an authorized or designated service representative.

Testing

Fuel Evaporative Test

According to an embodiment of the invention, the tank tester may include a test module. The test module may be utilized to conduct various fuel tank tests such as, for example, a fuel evaporative test. A fuel evaporative test may be performed to determine or calculate of the size of a hole in a fuel tank of unknown volume.

During a fuel evaporative test, the tank tester may pressurize a fuel tank. During pressurization, the tank tester may determine if the maximum allowable fill time has been exceeded. If the fuel tank cannot be pressurized to a predetermined pressure in a predetermined amount of time, a gross leak may be present. If the fuel tank passes the fill-time portion of the test (indicating no gross leak), the test module may determine whether an otherwise unacceptable leak exists in the fuel tank (i.e., pass or fail). In accordance with this test, the tank tester may calculate the vapor space within the fuel tank being tested.

Flow Method

In another embodiment of the invention, the test module of the tank tester may perform a fuel evaporative test using a "flow method." In this embodiment, the testing component of the tank tester may have two filling paths: Fast Fill Flow and Slow Fill Flow.

Using the Fast Fill Flow path, a fuel tank may be pressurized to a predetermined pressure level such as, for example, 14" $H_2O$ at a rate of approximately 8.5 standard liters per minute (SLPM). Once the desired pressure is achieved, the tank tester may switch to the Slow Fill Flow path. The Slow Fill Flow path may have an orifice and a precision pressure regulator set to a predetermined pressure level such as, for example, 14" $H_2O$. The precision pressure regulator attempts to maintain a constant pressure in the tank. If the tank has no leak, there will be no flow. If the tank has a leak, the flow rate of gas required to keep a constant pressure in the tank should be the flow rate of the leak. Based on this flow rate and the pressure in the tank, the size of the hole in the tank may be calculated and compared to a calibration standard.

Once a hole size is determined by the constant flow method, the tank may be allowed to leak down over a predetermine period. Based on the pressure drop in the tank versus time, the volume of the tank may be calculated. If the tank does not have any leaks, the volume may be calculated based on the Fast Fill Flow time and Fast Fill Flow rate.

Constant Flow Test

In another embodiment of the invention, the test module may perform a constant flow test. The constant flow test may operate by applying a constant flow of air to the fuel tank which may result in a increasing pressure. By measuring the rate at which a pressure corresponding to the pressure in the fuel tank increases, a determination may be made as to the integrity of the fuel tank (or fuel system). The pressure inside an un-compromised fuel tank would increase at a greater rate than that inside a compromised fuel tank. In some embodiments, the degree to which the fuel tank is compromised may be determined by the rate at which the pressure inside the fuel tank increases.

Leak Down

According to embodiment, the test module may test the integrity of a fuel tank using a leak down test. In performing the leak down test, the tank tester may pressurize the fuel tank to a predetermined pressure. Once the predetermined pressure is reached, a time interval elapses, and the pressure in the fuel tank is measured. Successive time intervals and pressure measurements may occur. If the pressure in the fuel tank remains approximately at the predetermined pressure, the fuel tank (or fuel system) may not be compromised (e.g., no leaks, or leaks within an accepted tolerance). If the pressure in the fuel tank decreases, the fuel tank (or fuel system) is most likely comprised (e.g., has a leak). The tank tester may then perform calculations to determine the size of the leak and whether the leak is acceptable (e.g., pass/fail).

Vacuum Testing

According to an embodiment of the invention, the test module may determine the integrity of a fuel tank (or fuel system) using vacuum testing. In one embodiment, vacuum testing may comprise reducing pressure in a fuel tank to a predetermined pressure below ambient pressure. Such a predetermined pressure may be achieved by applying a vacuum to the fuel tank. Once the predetermined pressure is reached, a pressure corresponding to the pressure in the fuel tank is measured. If the pressure in the fuel tank remains approximately at the predetermined pressure, the fuel tank (or fuel system) may not be compromised (e.g., no leaks, or leaks within an accepted tolerance). If the pressure in the fuel tank increases, the fuel tank (or fuel system) may be comprised (e.g., has a leak). The tank tester may then perform calculations to determine the size of the leak and whether the leak is acceptable (e.g., pass/fail).

In another embodiment of the invention, vacuum testing may include applying a continuous vacuum to a fuel tank which results in a decreasing pressure inside the fuel tank. By measuring the rate at which a pressure corresponding to the pressure in the fuel tank decreases, a determination may be made as to the integrity of the fuel tank (or fuel system). The pressure inside an uncompromised fuel tank would decrease at a greater rate than that inside a compromised fuel tank. In some embodiments, the degree to which the fuel tank is compromised may be determined by the rate at which the pressure inside the fuel tank decreases.

Mechanical Pressure

According to one aspect of the invention, the test module of the tank tester may determine the integrity of the fuel tank (or fuel system) by applying a constant, predetermined pressure to the fuel tank via a mechanical device, such as a piston and cylinder. A force may be applied to the piston commensurate with the desired predetermined pressure to be applied to the fuel tank. Once a predetermined pressure has been reached in the tank, the force applied to the piston and the force corresponding to the pressure in the fuel tank should be equal and opposite. If the fuel system is uncompromised (e.g., no leaks), the piston should remain stationary (or nearly so). If the fuel system is compromised (e.g., leaks), the piston should move. The degree to which the piston moves is related to the degree to which the fuel system leaks. The movement of the piston in the cylinder may be measured via various well known mechanisms.

Manual Mode

In one embodiment of the invention, the tank tester may include a manual-test module. The manual-test module may perform a manual test sequence. In performing the manual test sequence a user may first select the manual test mode, connect the tank tester to a fuel tank, and initiate a manual test. The tank tester may then pressurize the fuel tank to a predetermined pressure level such as, for example, 14" $H_2O$. The tank tester may maintain that pressure for a predetermined time period. During pressurization, a user may take readings from the various sensors and transducers of the tank tester for use in determining the various qualities of a fuel tank being tested. At the end of the predetermined time period, the tester may vent any remaining tank pressure.

Multiple Standards

The test module may utilize different predefined standards for fuel tank tests. In one embodiment, a standard may be defined as a leak that exceeds an equivalent size gap. For example, the test module may base a pass/fail determination on a standard of a 0.020" gap. Where a fuel evaporative system leak is less than or equal to a 0.020" diameter gap the test module may return a pass determination. Accordingly, the test module may fail the fuel evaporative system where the leak exceeds a 0.020" diameter gap.

Under a different standard such as, for instance, a 0.040" diameter gap standard, the test module may pass a vehicle where the fuel evaporative system leak is less than or equal to a 0.040" diameter gap, and fail the fuel evaporative system where the leak exceeds a 0.040" diameter gap. The false pass error rate may be less than ±5% and the false fail error rate may be less than ±1%. Other pass/fail standards and error rates may be used. All data pertinent to test standards may be stored in a file. This file may contain any and all data and/or algorithms required to make the Pass/Fail decision in the tank tester.

Calculations and Compensation

According to one aspect of the invention, the tank tester may further comprise a data analysis module. The data analysis module may, among other things, measure vapor space, temperature, and Reid Vapor Pressure (RVP) within a fuel tank being tested, and may compensate for these factors when making test calculations.

Temperature measurements may be taken by one or more temperature sensors included in the tank tester. The temperature sensors may be placed in various locations within the testing component, and may be connected to a sensor or other element of the computer component of the tank tester. Additionally, various hardware and/or software components associated with the tank tester may be used to determine liquid fuel temperature based on measured vapor temperature. These temperature readings may be used in the calculations made during the various tests performed by the tank tester.

The tank tester may also include a barometric pressure sensor that may enable measurement of the barometric pressure of the testing environment in which the tank tester is being used. The testing component may also include an ambient temperature sensor that may enable measurement of the ambient temperature of the testing environment. These measurements may also be used in the calculations performed by the tank tester.

Reid Vapor Pressure (RVP) measurements may also be taken for the fuel in a fuel tank. RVP corresponds to the pressure induced in a closed volume (fuel tank) as a result of the liquid (fuel) in the closed volume evaporating. To improve the accuracy of the tank tester, the data analysis module may compensate for the RVP. In order to compute RVP, the data analysis module may obtain the following measurements or quantities: the volume of the fuel tank, the volume of the liquid in the tank, a measure of the liquid's tendency to evaporate, and the ambient temperature. With these variables, the amount of pressure induced by the evaporative effects of the fuel may determined.

In some embodiments of the invention, the RVP may be measured directly by, for instance, releasing the pressure in the fuel tank, resealing the fuel tank, allowing the closed system to reach a steady state condition, and measuring the RVP at steady state. Once the RVP is determined, the data analysis module may compensate for RVP in its pressure measurements as would be apparent.

In some embodiments, certain other measurements such as, for example the volume of the fuel tank, the volume of fuel in a fuel tank, the volume of vapor in the fuel tank, or other measurements, may be used by the tank tester in making calculations. In some embodiments, the volume of the fuel tank may be provided by the manufacturer of the fuel tank or integrator of the fuel system (e.g., an automobile manufacturer). In other embodiments, the volume of the fuel tank may be measured. In some embodiments, the volume of fuel may be measured. In other embodiments, the fuel tank may be drained and a known volume of fuel may be dispensed into the fuel tank. In some embodiments, the volume of the fuel tank and the volume of the liquid (fuel) may be used to determine the volume of vapor within the fuel tank. In other embodiments, the volume of the vapor may be measured directly without obtaining the volume of the fuel tank and/or the volume of the fuel.

Safety Measures

According to an embodiment of the invention, the tank tester may be configured to determine an overpressure condition for either an incoming supply pressure or a regulated test pressure. If at anytime during a procedure (for example, a fuel evaporative test or manual mode test) the tester inlet pressure from the air pressure regulator exceeds 35 psi (or other predetermined value), the tank tester may cease any test or procedure in progress. Tank tester software may prevent the tank tester from performing a pressurization of the fuel tank until any overpressure condition has been corrected.

Additionally, if at anytime during a procedure, the fuel tank pressure exceeds 28" $H_2O$ gauge (or other predetermined emergency pressure level), as measured by the tank tester, the tank tester may open one or more valves and vent any remaining pressure in the fuel tank. The tank tester may also prevent pressurization of the fuel tank for any procedure until the problem has been corrected. In some embodiments, a pressure switch may enable the release of pressure from the testing component upon the detection of the predetermined emergency pressure level. The pressure switch may act as a back-up in the event that a pressure transducer (or other element of the testing component) fails. According to one embodiment, the pressure switch may be wired in series with one or more valves within the testing component and may manipulate said valves to prevent over-pressurization as a fail-safe measure.

At anytime during any test sequence, the test may be aborted by the activation of an abort button operatively connected to the computer component of the tank tester. The abort button may cause the tester to immediately open a system relief valve, write the "Tech. Abort" code to the Error field of the Test Record (or otherwise record the aborted test), and subsequently return to a main menu (discussed in detail below).

Software Updates

The tank tester may include a software update module. The software update module may enable the software associated with the tank tester (including the operating application and various software modules) to be updated in a number of ways. Software associated with the tank tester may be updated by a modem. For example, a built-in modem may dial a 1-800 number, allow a query of the tank tester for the software version, and update software modules and databases as required. In another embodiment, the tank tester may be connected to a phone line and a host may call the tank tester to commence an update process.

In yet another embodiment, software may be updated using a compact flash card or other memory storage device within the tank tester, which may be removed from the tank tester, sent to a service provider for reprogramming, and reintroduced into the tank tester with updated software. Alternatively, memory storage devices containing updated software may be sent to tank tester users as replacements for older devices.

In another embodiment, software may be updated by connecting the tank tester to a personal computer (or other computer). A user may then connect to the Internet or other designated network and link to a provider web page to download software updates. These updates may then be communicated to and stored within the tank tester. Alternatively, the tank tester may contain sufficient computer hardware and/or software to connect to the Internet or other network without the aid of an additional computer.

Menus

In one embodiment, the tank tester may include a main menu. Any one or more of the following menu options may be displayed in the main menu (or other menus) and may be facilitated by the tank tester's software and/or hardware: (1) Fuel Evaporative Test, (2) Diagnostic Manual Mode testing, (3) Calibration, (4) Self-test, (4) Status Mode, (5) Software update, (6) Service mode, (7) QA State Menu, or other options.

In one embodiment a Status Mode may display the following information: testing station's license number (or other testing station identification); next test record number; tester number; date/time; loaded software version number; update software version number; and tester lock out reason.

In one embodiment, a QA State Menu may provide access to certain data stored on the tank tester. The QA State Menu may be accessed via the tank tester's display device and user input device, a separate computer (such as a laptop), or other device. The QA State Menu may include a menu comprising one or more of the following options: update config. tables, load software update, download test records, download calibration records, lock-out tester, or other options. The QA State Menu may be password protected via a password protection module of the tank tester. The password protection module may also be used to provide password protection to any menu or feature of the invention described herein.

System Communications

According to an embodiment, the tank tester may include a communications module. The communications module may enable standard RS232 communications protocols that may be used for communication between an EIS and the tank tester. In addition, a laptop computer (or other suitable device) using RS232 communications may be used for software and table updates for the tank tester. Communications protocols as used herein may enable users to perform one or more various functions including, for example: updating operating software as deemed necessary; updating tables for pass/fail standards; downloading test data from records stored in the tank tester; downloading tank tester calibration records stored in the tank tester; outputting pass/fail results to the EIS; or communicating with other computers or a network of computers. Furthermore, the communications module may perform updates and other communications using a modem incorporated into the tank tester. Protocols other than RS232 may be used.

According to an embodiment of the invention, the tank tester may include a serial mode module for serial mode operation. Serial mode operation may be two-fold. A first serial mode operation may be for checkout and testing of production line tank testers and repair of returned tank testers. A second serial mode operation may be for integrating communication to EIS equipment. The configuration of the serial port may, for instance, have a baud rate fixed at 9600 baud. Other signaling rates may be used.

According to an embodiment, with the tank tester connected to and communicating with an EIS, the tank tester may be powered by a 12 VDC source limited to 0.5 amps supplied by the RS 232 communications port. Other configurations may be implemented. Alternatively, the tank tester may be integrated with an EIS.

According to an embodiment, a development/service mode may also be provided. The development/service mode may run an evaporative test and show current pressure, temperature and flow readings during the test and show results after the test is finished. The development/service mode may also run a manual service and test mode while displaying sensor readings solenoid or valve status. Furthermore, the development mode may allow the update of software, databases and tables in conjunction with or apart from other features described herein.

Interlocking Tank Adaptor Safety Mechanism

In one embodiment, the tank adaptor of the tank tester (which interfaces with and seals the tank tester to the fuel system) may provide a closed system between the fuel system and the tank tester. In some embodiments of the invention, the tank adaptor may allow the tank tester to pressurize the fuel system, among other things.

One drawback associated with pressurizing a fuel system may arise when a fuel tank is full, or nearly full, of fuel. If the pressure is not properly released, some fuel may spill or splash out of the tank. According to one aspect of the invention, the tank tester may include an interlock that prevents fuel from spilling, splashing, or otherwise being released from the fuel system when it is depressurized. This may be accomplished either at (or proximate to) the tank adaptor alone, or in combination with various functionality incorporated into the tank tester.

In some embodiments, the tank adaptor may be unable to be physically removed from the fuel neck until pressure inside the fuel tank returns to ambient pressure. For example, the tank adaptor may incorporate or otherwise operate with an interlock that prevents the tank adaptor from being removed from the fuel neck until pressure inside the tank returns to ambient pressure.

In some embodiments, the tank adaptor may include a valve (e.g., bleed valve, etc.) that releases the pressure in the fuel system. In some embodiments, the valve may include an automated valve that controls the return of ambient pressure to the fuel tank.

Hydrocarbon Detector

In one embodiment, the tank tester may contain various mechanical components, hardware components, and/or software components (or modules, such as a hydrocarbon detection module) that may enable the tank tester to detect fuel vapor that escapes from the fuel system. To facilitate fuel vapor detection, a small amount of pressure above ambient pressure may be applied to the fuel system. This pressure may force any fuel vapor out of a compromised fuel system. Such fuel vapor may be detected by a detector incorporated into the tank tester such as, for example, a gas analyzer or other detector capable of detecting hydrocarbons. In addition to detecting whether fuel vapor may be leaking from the fuel system, the detector may also be used to determine the approximate location of the leak by, for example, using a probe from the detector to identify areas with increased levels of hydrocarbons. Devices suitable for hydrocarbon detection are known to those skilled in the art.

Integrated Fuel Cap and Fuel Tank Testing

Currently, tank integrity and fuel cap tests may be performed separately. According to one aspect of the invention, the tank tester may be modified to contain sufficient devices, as well as computer hardware and/or software to enable simultaneous measurement of fuel cap leakage and fuel tank integrity.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF PREFERRED EMBODIMENTS

Figure 1:
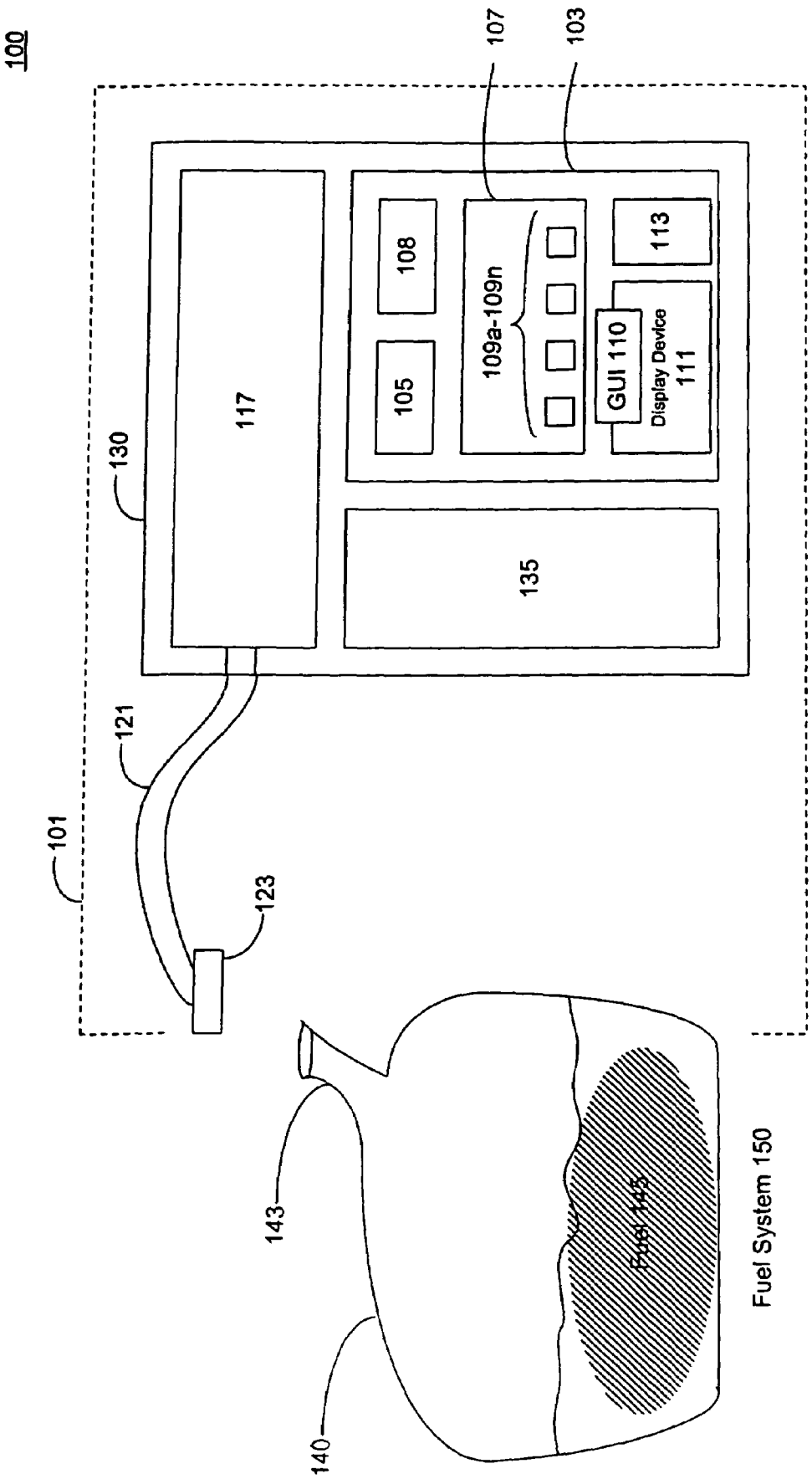
FIG. 1 is a schematic diagram of a tank tester system, according to an embodiment of the invention.

According to an embodiment illustrated in FIG. 1, a system 100 is provided for a tank tester 101. Tank tester 101 may be used to test the integrity of a fuel system 150, as described in greater detail below. Fuel system 150 may include a fuel tank 140, a fuel tank neck 143, fuel 145, and/or other elements. Fuel system 150 may by a fuel system for a car, motorcycle, light-duty truck, heavy-duty truck, or other motor vehicle. Tank tester 101 may include a computer-implemented component 103 ("computer component 103"), a testing component 117, a housing 130, a calibration tank 135, and/or other elements.

Computer Component

In one embodiment, computer component 103 may include various computer hardware and software elements such as, for example, a processor 105. Processor 105 may be or include, for instance, any of the Intel x86 PC/AT microprocessors or compatible processors such as those available from Cyrix or AMD.

Computer component 103 may include an operating application 107. Operating application 107 may include one or more software modules 109a-109n enabling the operation of, and user interaction with, tank tester 101. Operating application 107 may be based on any one of many computer programming languages such as, for example, C, C++, or other programming language.

In particular, operating application 107 may include a data analysis module, a test module, a calibration module, a self-test module, a manual test module, a communications module, a serial mode module, a software update module, a password protection module, a hydrocarbon detection module, and/or other modules. The features enabled may include, among other things, fuel tank temperature measurement, fuel tank pressure measurements, tank tester calibration procedures, fuel tank integrity tests, vapor space compensation, temperature compensation, Reid Vapor Pressure (RVP) compensation, hydrocarbon detection, interface with an Emissions Inspections System (EIS), and other features. One or more of the modules comprising operating application 107 may be combined. For some purposes, not all modules may be necessary.

In one embodiment, operating application 107 may also include, or have access to, data look-up tables, and may use table calls for fuel tank vapor space calculations, pass/fail decisions, and/or other calculations and decisions. These tables may compensate for temperature and RVP when making the vapor space calculations, pass/fail determinations, or other calculations or decisions. In addition, operating application 107 may write test results and calibration test results to a record ("test record").

Computer component 103 may include one or more memory devices 108. Memory device 108 may include, for instance, flash erasable programmable read only memory (FEPROM), hard disk, or other suitable memory for data storage. Memory device 108 may enable the storage of test records or other results or error files. Memory device 108 may also enable the storage of any data necessary to perform the functions of tank tester 101 described herein.

According to an embodiment of the invention, one or more users may access tank tester 101 and operating application 107 through an interface. The interface may comprise a graphical user interface (GUI) 110 presented to a user on a display device 111. The user may interact with operating application 107 and GUI 110 via a user input device 113. Display device 111 may be or include, for instance, a display screen such as a 20" by 4" LCD screen. In some embodiments, display device 111 may include other types of known display screens.

In one embodiment, user input device 113 may be or include, for instance, a 4 by 4 digital keypad with various keys. In another embodiment, user input device 113 may include a combination of four buttons to accommodate one or more of the following functions for scrolling through and selecting items from menus displayed via graphical user interface 110: (1) scroll up; (2) scroll down; (3) select (or start); and (4) abort. Alternately, a rocker type switch may be substituted to accommodate the scroll up and down function thereby reducing the number of buttons to three. Other configurations are possible. In some embodiments, user input device 113 may include other types of known input devices or keyboards.

In one embodiment, display device 111 may enable interaction with GUI 110 via various menus, with which a user may interact, using user input device 113. Both display device 111 and user input device 113 may be operatively connected to processor 105.

It should be understood that various software modules 109a-109n utilized to accomplish the functionalities described herein may be maintained on one or more of processor 105, control application 107, memory device 108, or other components of the system. In other embodiments, as would be appreciated, the functionalities described herein may be implemented in various combinations of hardware and/or firmware, in addition to, or instead of, software.

In one embodiment, tank tester 101 may also include an outlet hose 121. Outlet hose 121 may include a section of pneumatic conduit that may enable pneumatic connection between tank tester 101 and fuel system 150. One end of outlet hose 121 may terminate in a tank adaptor 123. Tank adaptor 123 may be one of a set of fuel tank filler neck adaptors that may interface with fuel neck 143, regardless of the make or model of the vehicle of which fuel system 150 is a part.

Figure 2:
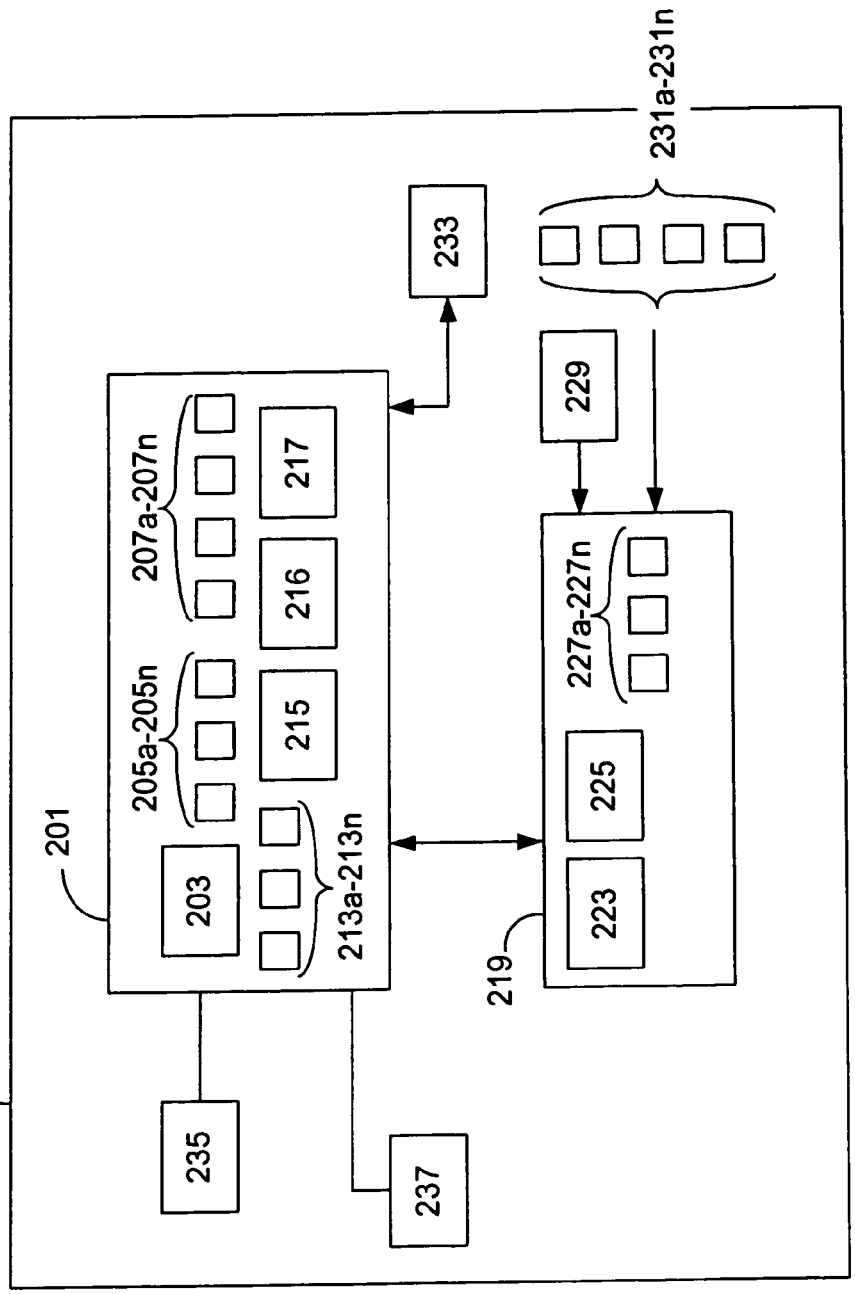
FIG. 2 is an exemplary illustration of various components which may be utilized by a tank tester system, according to an embodiment of the invention.

In an embodiment of the invention illustrated in FIG. 2, an exemplary configuration of computer component 103 may be provided in a system 200. System 200 may include a processor board 201. Processor board 201 may include a processor 203. Processor board 201 may also include, for instance, one or more analog inputs 205a-205n with A/D converters for interface with various sensors, one or more digital outputs 207a-207n to interface with one or more solenoids or other elements. Processor board 201 may also include one or more serial ports 213a-213n which may interface with additional equipment such as, for example, Emissions Inspection Systems (EIS) equipment, a modem 216, a real time clock 215, or other elements. Processor board 201 may also include one or more memory devices 217. One or more memory devices 217 may include FEPROM, a hard disk, or other suitable memory for storing data.

System 200 may also include a signal conditioning board 219 operatively connected to processor board 201. Signal conditioning board 219 may, among other things, condition electrical signals into and out from any sensors. Such signal conditioning may be accomplished as would be apparent to one skilled in the art. Signal conditioning board 219 may include a DC/DC power supply 223. Power supply 223 may include a 12 volt 0.5 amp power supply, although other voltages and amperages may be used. Signal conditioning board 219 may also include a pressure switch control 225 which may release pressure from testing component 117 (FIG. 1) when a predetermined pressure is reached within testing component 117. Signal conditioning board 219 may also include one or more solenoid drivers 227a-227n for operating one or more solenoids throughout tank tester 101. One or more solenoids may be useful for the operation of various elements of testing component 117 such as, for example, switches, valves, or other elements.

System 200 may include tamper switch 229 operatively connected to processor board 201 and/or signal conditioning board 219.

System 200 may include one or more sensors 231a-231n operatively connected to processor board 201 and/or signal conditioning board 219. One or more sensors 231a-231n may include pressure transducers, temperature sensors, or other sensors for the operation of tank tester 101.

System 200 may also include external memory 233 operatively connected to processor board 201. External memory 233 may include flash memory, a hard disk, or other suitable memory for storing run time programs, vehicle databases, testing lookup tables, recent test results, or other data.

Furthermore, computer component 103 may include a display device 235 and a user input device 237 operatively connected to processor board 201. Display device 235 and user input device 237 may be the same as, or similar to, display device 111 and user input device 113 described above with reference to FIG. 1.

Figure 3:
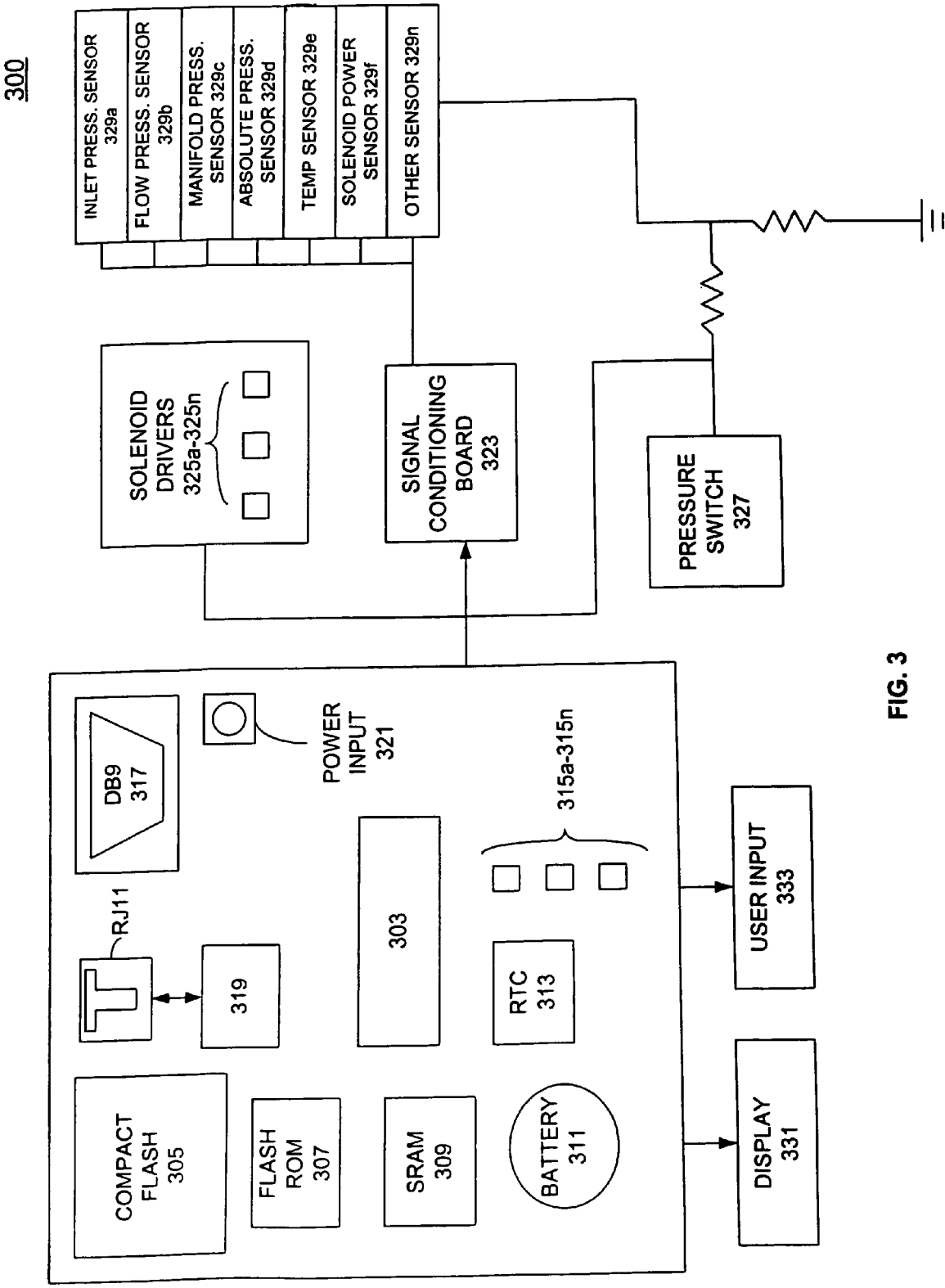
FIG. 3 is an exemplary illustration of various components which may be utilized by a tank tester system, according to an embodiment of the invention.

In an embodiment of the invention illustrated in FIG. 3, an alternative configuration of computer component 103 may be provided in a system 300. System 300 may include a processor board 301. Processor board 301 may include a processor 303. Processor board 301 may also include, for instance, 50 pin compact flash memory 305, 512 kb (or other memory size) flash ROM 307, 512 kb (or other memory size) SRAM 309, a battery 311, a real time clock 313, one or more serial ports 315a-315n, a DB9 (or other format) connector 317, a plug in modem card 319 which may include an RJ11 or similar connector, a power input 321 and other elements.

System 300 may also include a signal conditioning board 323 operatively connected to processor board 301. System 300 may include one or more solenoid drivers 325a-325n operatively connected to processor boards 301 and/or signal conditioning board 323 which may enable the operation of one or more solenoids throughout tank tester 101. System 300 may include a pressure switch 327 operatively connected to processor board 301 and/or signal conditioning board 323, which may enable the release of pressure from testing component 117 (FIG. 1) upon the existence of a predetermined pressure within testing component 117.

System 300 may also include one or more sensors 329a-329n operatively connected to processor board 301 and/or signal conditioning board 323. One or more sensors may include, for instance, a inlet pressure sensor 329a, a flow pressure sensor 329b, a manifold pressure sensor 329c, a absolute pressure sensor 329d, a temperature sensor 329e, a solenoid power sensor 329, or other sensors 329n.

Furthermore, system 300 may include a display device 331 and a user input device 333 operatively connected to processor board 301. Display device 331 and user input device 333 may be the same as, or similar to, display device 111 and user input device 113 described above with reference to FIG. 1.

Those having skill in the art will appreciate that the aforementioned systems may work with various configurations. Accordingly, more or less of the aforementioned system components may be used and/or combined in various embodiments.

According to one embodiment, the power consumption by tank tester 101 may be slightly less than 12 Volts, 0.5 Amps (6 Watts). Other configurations may be implemented. In some embodiments, a 110 VAC wall pack transformer and connector to tank tester 101 may also be provided.

Testing Component

According to an embodiment of the invention, tank tester 101 may include a testing component 117. Testing component 117 may include various electronic sensor elements, electronic control elements, and pneumatic pluming elements for performing the operations of tank tester 101 described herein.

Figure 4:
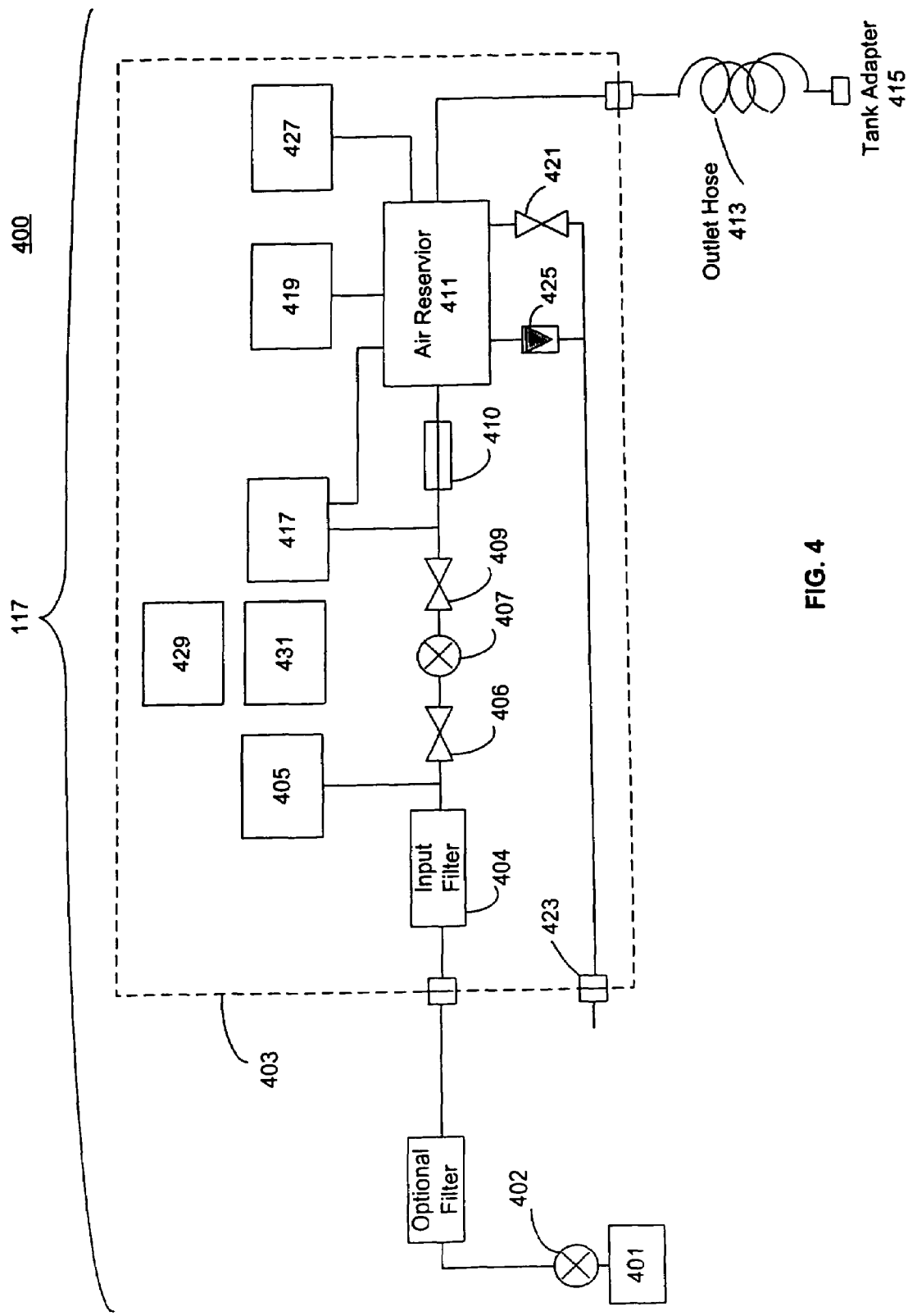
FIG. 4 is an exemplary illustration of various sensors and plumbing components for use with a tank tester system, according to an embodiment of the invention.

In an embodiment of the invention illustrated in FIG. 4, an exemplary configuration of testing component 117 may be provided in a system 400. System 400 may include a pressurized gas source 401. Pressurized gas source 401 may contain and/or produce pressurized gas for use in tank tester 101. Pressurized gas may include nitrogen, compressed air, or other gas. If tank tester 101 uses nitrogen as a pressurizing gas, the nitrogen may be 98% pure. Other concentrations may be used. If tank tester 101 uses compressed air as a pressurizing gas, an air filter capable of removing harmful contaminants and moisture from the compressed air source may be included. This filter may ensure that no contaminants enter tank tester 101 that could physically block any orifice, or chemically contaminate the internal components of tank tester 101. The filter may comprise material known to one of skill in the art and may be configured to filter down to 5-micron size particles.

Pressurized gas source 401 may reside outside a testing component housing 403. In alternative embodiments, pressurized gas source 401 may reside inside a testing component housing (or other housing) or enclosures associated with tank tester 101.

Pressurized gas source 401 may be pneumatically connected to an input filter 404. Input filter 404 may enable filtering of particulates or contaminates from pressurized gas flowing from pressurized gas source 401. Furthermore, a high pressure regulator 402 may be pneumatically connected to pressurized gas source 401 to enable regulation of pressure into testing component 117. According to an embodiment of the invention, pressure regulator 402 (and other pressure regulators described herein) may enable a controlled flow rate of between two and four liters per minute (LPM). Other flow rates or ranges of flow rates may be achieved.

Pressurized gas source 401 may be pneumatically connected to an inlet pressure transducer 405. Pneumatic connection may be accomplished by pneumatic conduit which may comprise material known to one skilled in the art, suitable to perform the various functions and processes described herein. Inlet pressure transducer 405 may include an electronic sensor enabling the measurement and communication of pressure levels to computer component 103. In one embodiment, inlet pressure transducer 405 may sense pressure ranges from 0-50 pounds per square inch (psi). Other pressure ranges may be used. Inlet pressure transducer 405 may monitor the inlet pressure levels of testing component 117 and communicate those pressure levels to computer component 103. Computer component 103 may then take appropriate action. For example, if inlet pressure levels exceed a predetermined level such as, for instance, 35 psi, valves or other elements within testing component 117 may be activated to correct the situation. According to an embodiment of the invention, tank tester 101 may be configured to measure inlet pressures of 0-35 psi within ±10% of point, and internal tank tester pressures of 0"-28" $H_2O$ ±5% of range. Other ranges may be used.

Pressurized gas source 401 may also be pneumatically connected to a first valve 406. First valve 406 may enable partial or complete obstruction of gas flow through testing component 117. First valve 406 may have a first end and a second end. In one embodiment, an input filter 404 may be pneumatically connected between pressurized gas source 401 and first valve 406. In some embodiments, first valve 406 may be, include, or be controlled by, a mechanism such as, for example, a solenoid driver or other mechanism.

The second end of first valve 406 may be pneumatically connected to pressure regulator 407. Pressure regulator 407 may enable a specific flow rate of gas through testing component 117. Pressure regulator 407 may be pneumatically connected to a second valve 409. Second valve 409 may enable partial or complete obstruction of gas flow through testing component 117. Second valve 409 may have a first end and a second end. In one embodiment, the first end of second valve may be pneumatically connected to pressure regulator 407. In some embodiments, second valve 409 may be, include, or be controlled by a mechanism such as, for example, a solenoid driver or other mechanism.

The second end of second valve 409 may be pneumatically connected to an orifice 410. Orifice 410 may include a section of pneumatic conduit of predetermined inner diameter through which gas may flow. When open, orifice 410 may include an inner diameter of 0.023 centimeters. Other diameters may be used for orifice 410. Orifice 410 may enable the controlled flow of gas through testing component 117 and may be controlled by an electronic switch.

Orifice 410 may be pneumatically connected to air reservoir 411. Air reservoir 411 may include an enclosure in which gas may be stored and/or through which gas may flow. In one embodiment, air reservoir 411 may hold up to 0.34 liters of gas. In other embodiments other volumes of gas may be held in air reservoir 411.

An outlet hose 413 may be pneumatically connected to air reservoir 411. In alternative embodiments outlet hose 413 may be connected directly to orifice 410, the second end of second valve 409 or other element of testing component 117. Outlet hose 413 may have first and second ends. The first end of outlet hose 413 may be pneumatically connected to air reservoir or other element of testing component 117. The second end of outlet hose 413 may end in tank adaptor 415. Tank adaptor 415 may include a set of fuel filler neck adaptors that provide connectivity to various vehicles.

According to an embodiment of the invention, tank adaptor 415, outlet hose 413, and any pneumatic conduit or gasket materials may be pliable and impermeable to some or all gasoline constituents including, for instance, Methyl Tertiary Butyl Ether (MTBE), ethanol, and methanol. Furthermore, tank adaptor 415, outlet hose 413, and other elements within testing component 117 may be fitted with quick disconnect couplers that facilitate easy and rapid connection and disconnection from the vehicle.

A differential transducer 417 may be pneumatically connected between the second end of second valve 409 and orifice 410. Differential transducer 417 may also be pneumatically connected to air reservoir 411. Differential transducer 417 may include an electronic sensor enabling the measurement and communication of pressure levels to computer component 103. In one embodiment, differential transducer 417 may sense pressure ranges from 0-14.5 psi. Other pressure ranges may be used. Differential transducer 417 may measure the pressure differential between a section of pneumatic conduit prior to orifice 410 and air reservoir 411.

A reservoir pressure transducer 419 may be pneumatically connected to air reservoir 411. Reservoir pressure transducer 419 may include an electronic sensor enabling the measurement and communication of pressure levels in air reservoir 411 to computer component 103. In one embodiment, reservoir pressure transducer 419 may sense pressure ranges from 0-40" $H_2O$. Other pressure ranges may be used.

A third valve 421 may be pneumatically connected to air reservoir 411. Third valve 421 may enable partial or complete obstruction of gas flow through testing component 117. Third valve 421 may have a first end and a second end. In one embodiment, the first end of third valve may be pneumatically connected to air reservoir 411. In some embodiments, third valve 421 may be, include, or be controlled by a mechanism such as, for example, a solenoid driver or other mechanism.

The second end of third valve 421 may be pneumatically connected to a vent outlet 423. Vent outlet 423 may enable the outlet of gas from testing component 117. In some embodiments vent outlet 423 may be pneumatically connected to a filter and/or an outlet canister. For example, at the conclusion of a test, compressed fuel tank fumes may vent through vent outlet 423 into a charcoal canister. The remaining fuel tank fumes may be vented back though tank tester 101's valves to an alternate outlet. Testing component 117's alternate outlet may be routed out of a test facility (e.g., a building or other environment) or into another area/container. According to one embodiment, tank tester 101 may be fully vented to a separate container such as, for instance, a charcoal canister, that may be purged on a next (or other subsequent) test cycle.

A check valve 425 may be pneumatically connected to air reservoir 411. Check valve 425 may enable the release of gas to prevent over-pressurization. Check valve 425 may operate to allow such release upon a occurrence of a predetermined pressure level within testing component 117 such as, for instance, 1 psi or other predetermined pressure level ("cracking pressure"). Check valve 425 may have a first end and a second end. In one embodiment, the first end of check valve 425 may be pneumatically connected to air reservoir 411. In some embodiments, check valve 425 may be, include, or be controlled by a mechanism such as, for example, a solenoid driver or other mechanism. The second end of check valve 425 may be pneumatically connected to vent outlet 423.

A pressure switch 427 may be connected to testing component 117. Pressure switch 427 may include an electronic and/or mechanical switch that may open one or more valves to release pressure from testing component 117 upon the detection of a predetermined pressure within tank tester 101 or a fuel system being tested. A pressure switch 427 may act as a back-up in the event that a pressure transducer (or other element of testing component 117) fails. According to one embodiment, pressure switch 427 may be wired in series with one or more valves within testing component 117, and may manipulate the valves to prevent over-pressurization as a fail-safe measure.

A temperature sensor 429 may also be included in testing component 117. Temperature sensor 429 may determine the temperature of gas within testing unit 117 or a connected fuel system. Temperature sensor 429 may be placed in various locations within testing component 117 and may be connected to computer component 103. Testing component 117 may also include a barometric pressure sensor 431 for detecting the barometric pressure of a testing environment in which tank tester 101 is being used.

Figure 5:
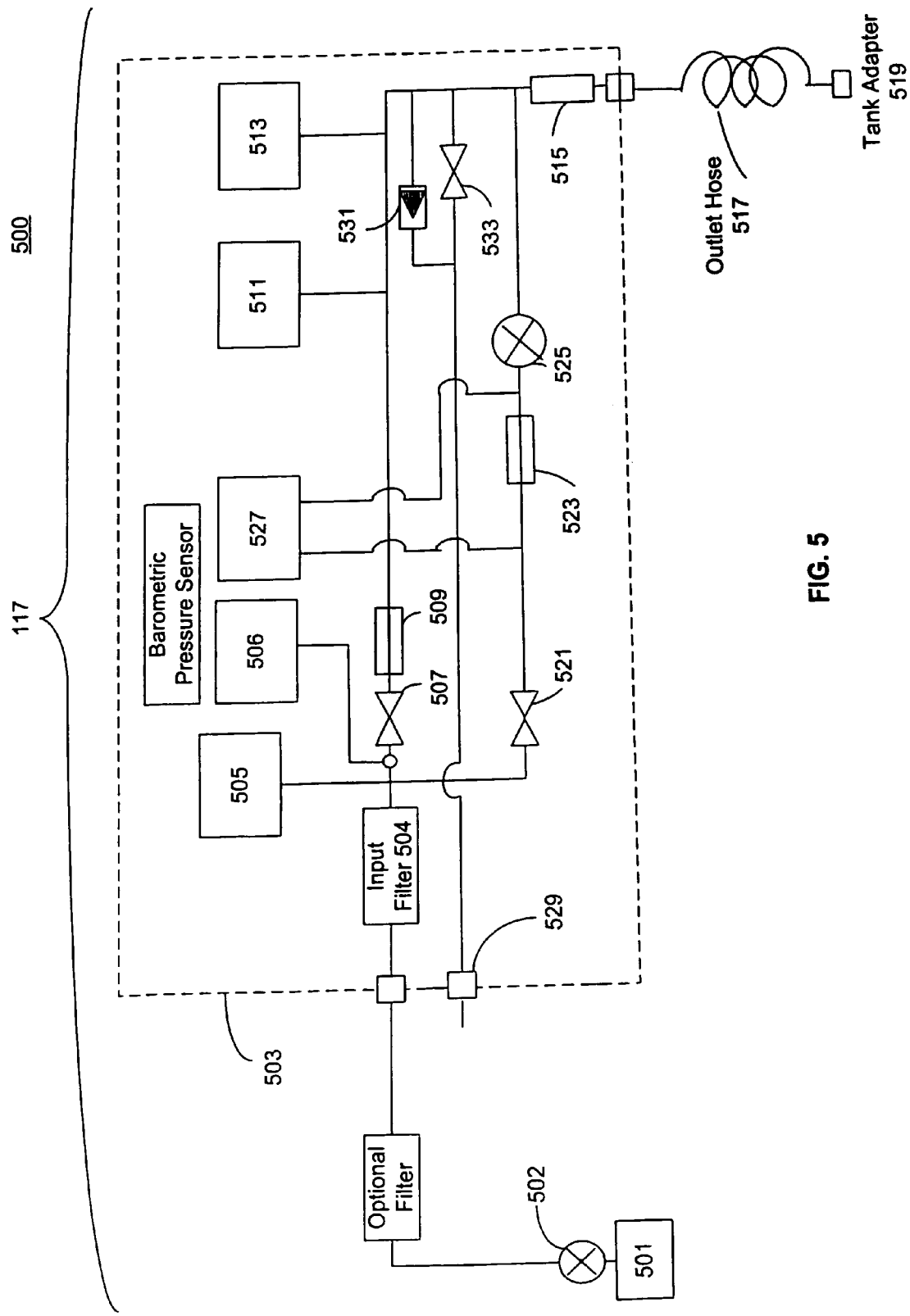
FIG. 5 is an exemplary illustration of various sensors and plumbing components for use with a tank tester system, according to an embodiment of the invention.

In an embodiment of the invention illustrated in FIG. 5, an alternative configuration of testing component 117 may be provided in a system 500. System 500 may include a pressurized gas source 501. Pressurized gas source 501 may contain and/or produce pressurized gas for use in tank tester 101. Pressurized gas source 501 may be pneumatically connected to input filter 504. Input filter 504 may enable filtering of particulates or contaminates from pressurized gas flowing from pressurized gas source 501. Furthermore, a high pressure regulator 502 may be pneumatically connected to pressurized gas source 501 to enable regulation of pressure into testing component 117.

Pressurized gas source 501 may be pneumatically connected to an inlet pressure transducer 505. Inlet pressure transducer 505 may include an electronic sensor for measuring and communicating pressure levels to computer component 103. In one embodiment, inlet pressure transducer 505 may sense pressure ranges from 0-100 psi. Other pressure ranges may be used.

Pressurized gas source 501 may also be pneumatically connected to a first valve 507. First valve 507 may enable partial or complete obstruction of gas flow through testing component 117. First valve 507 may have a first end and a second end. In one embodiment, the first end of first valve 507 may be pneumatically connected to input filter 504 and/or pressurized gas source 501. A temperature sensor 506 may be connected to a section of pneumatic conduit between input filter 504, or pressurized gas source 501, and first valve 507. Temperature sensor 506 may also be placed in other areas of testing component 117. Temperature sensor 506 may measure and communicate gas temperature to computer component 103. In some embodiments, tank tester 101 may include an ambient temperature sensor for measuring the temperature of a surrounding testing environment.

The second end of first valve 507 may be pneumatically connected to a first orifice 509. First orifice 509 may include a section of pneumatic conduit of predetermined inner diameter through which gas may flow. When open, first orifice 509 may include an inner diameter of 0.024 centimeters. Other diameters may be used. First orifice 509 may enable controlled flow of gas through testing component 117 and may be controlled by an electronic switch connected to computer component 103.

First orifice 509 may be pneumatically connected to manifold transducer 511. Manifold transducer 511 may include an electronic sensor for measuring and communicating pressure levels to computer component 103. In one embodiment, manifold transducer 511 may sense pressure ranges from 0-1.45 psi. Other pressure ranges may be used.

First orifice 509 may be pneumatically connected to a pressure switch 513. Pressure switch 513 may include an electronic and/or mechanical switch that may enable the release of pressure from testing component 117 via one or more valves upon the detection of a predetermined pressure such as, for instance, 25" $H_2O$ or other pressure level.

First orifice 509 may be pneumatically connected to outlet filter 515. Outlet filter 515 may include an activated charcoal filter or other filter for removing particulates and impurities from gas traveling into an outlet hose 517. Outlet hose 517 may have first and second ends. The first end of outlet hose 517 may be pneumatically connected to outlet filter 515. In alternative embodiments, the first end of outlet hose 517 may not be connected to outlet filter 515, but may rather be connected to first orifice 509, to the second end of first valve 507, or to another element of testing component 117. The second end of outlet hose 517 may terminate in tank adaptor 519.

Pressurized gas source 501 may also be pneumatically connected to a second valve 521. Second valve 521 may enable partial or complete obstruction of gas flow through testing component 117. Second valve 521 may have a first end and a second end. In one embodiment, the first end of second valve 521 may be pneumatically connected to input filter 504 and/or pressurized gas source 501. In some embodiments, second valve 521 may be, include, or be controlled by a mechanism such as, for example, a solenoid driver or other mechanism.

The second end of second valve 521 may be pneumatically connected to a second orifice 523. Second orifice 523 may include a section of pneumatic conduit of predetermined inner diameter through which gas may flow. When open, second orifice 523 may include an inner diameter of 0.022 centimeters. Other diameters may be used. Second orifice 523 may enable the controlled flow of gas through testing component 117, and may be controlled by an electronic switch connected to computer component 103.

Second orifice 523 may be pneumatically connected to a pressure regulator 525. Pressure regulator 525 may enable the controlled flow of gas through testing component 117. Pressure regulator may be pneumatically connected to a section of pneumatic conduit between first orifice 509 and outlet filter 515, or may be otherwise pneumatically connected to outlet hose 517.

A differential transducer 527 may be pneumatically connected to a section of pneumatic conduit located between the second end of second valve 521 and second orifice 523. Differential transducer 527 may also be pneumatically connected to a section of pneumatic conduit located between second orifice 523 and pressure regulator 525. Differential transducer 527 may include an electronic sensor for measuring and communicating pressure levels to computer component 103. In one embodiment, differential transducer 527 may sense pressure ranges from 0-14.5 pounds per square inch (PSI). Other pressure ranges may be used. Differential transducer 527 may measure the pressure differential between a section of pneumatic conduit on either side of second orifice 523.

A vent outlet 529 may be pneumatically connected to a section of pneumatic conduit located between first valve 507 and outlet hose 517. Vent outlet 529 may enable the outlet of pressure and gas from testing component 117. In some embodiments vent outlet may be pneumatically connected to a filter and/or an outlet tank.

A check valve 531 may be pneumatically connected to testing component 117. Check valve 531 may enable the release of pressure from testing component 117 to prevent over-pressurization. Check valve may operate to allow such a release upon reaching a predetermined pressure level within testing component 117 such as, for instance, 1 psi or other predetermined pressure level ("cracking pressure"). In some embodiments, check valve 531 may be, include, or be controlled by a mechanism such as, for example, a solenoid driver or other mechanism.

A relief valve 533 having first and second ends may be pneumatically connected to testing component 117. The first end of relief valve 533 may be pneumatically connected to a portion of pneumatic conduit located between first valve 507 and outlet hose 517. The second end of relief valve 533 may be pneumatically connected to vent outlet 529. Relief valve 533 may enable partial or complete obstruction of gas flow through testing component 117.

Housing and Calibration Tank

According to an embodiment of the invention illustrated in FIG. 1, tank tester 101 may include a housing 130. In one embodiment of the invention, housing 130 may enclose one or more components (e.g., 103, 117) of tank tester 101. In another embodiment of the invention, housing 130 may support one or more components of tank tester 101. These components may be supported either internally within housing 130, externally to housing 130, or partially internal and partially external to housing 130. In another embodiment, housing 130 may comprise a custom impact-resistant plastic enclosure with a carrying strap and/or handle.

In one embodiment of the invention, a calibration tank 135 may be included in tank tester 101. Calibration tank 135 may form a volume that may be pressurized. In some embodiments, housing 130 itself (or a portion thereof) may form calibration tank 135. In these embodiments, housing 130 may be manufactured and assembled so as to form a compartment having a predetermined volume that may be pressurized. In various embodiments, the volume of calibration tank 135 may comprise one gallon, two gallons, five gallons, ten gallons or any other predetermined volume. In some embodiments this volume may be adjustable. Calibration tank 135 may also be constructed to withstand an internal pressure of at least 20" $H_2O$. Other pressure tolerances may be used. Furthermore, calibration tank 135 may be resistant to shock or other normal conditions present in an automotive repair shop or other environment with no more than 1% (or other percentage) deformation.

In one embodiment, calibration tank 135 may include a bladder (not otherwise illustrated). In some embodiments, the bladder may conform itself within housing 130. As discussed above, the bladder may comprise any predetermined volume that may also be pressurized.

In another embodiment, housing 130 and/or calibration tank 135 may include a blow-molded case (not otherwise illustrated) having a predetermined volume that may be pressurized. As discussed above, the case may be formed, machined, or molded to have any predetermined volume.

Calibration

According to an embodiment of the invention, tank tester 101 may include a calibration module. The calibration module may be utilized to calibrate various elements of tank tester 101. Calibration may be used to adjust and confirm the consistency and accuracy of tank tester 101's vapor space calculations, for various test pass/fail determinations, or for other calculations. Calibration may include, for example, pressurization of tank tester 101's internal components to check for leaks, calculation of a known calibration tank volume, testing of a calibration tank configured to pass, testing of a calibration tank configured to fail, or other procedures. Calibration may also include various self-tests of the tank tester 101's transducers, temperature sensors, or other components.

According to one embodiment, the calibration module may utilize an internal clock (e.g., real time clock 215 of FIG. 2) to determine when calibration is due. As an example, the calibration module may automatically lock out test procedures on tank tester 101 every 72 hours pending a successful completion of one or more calibration procedures. Other time intervals may be used.

Figure 6:
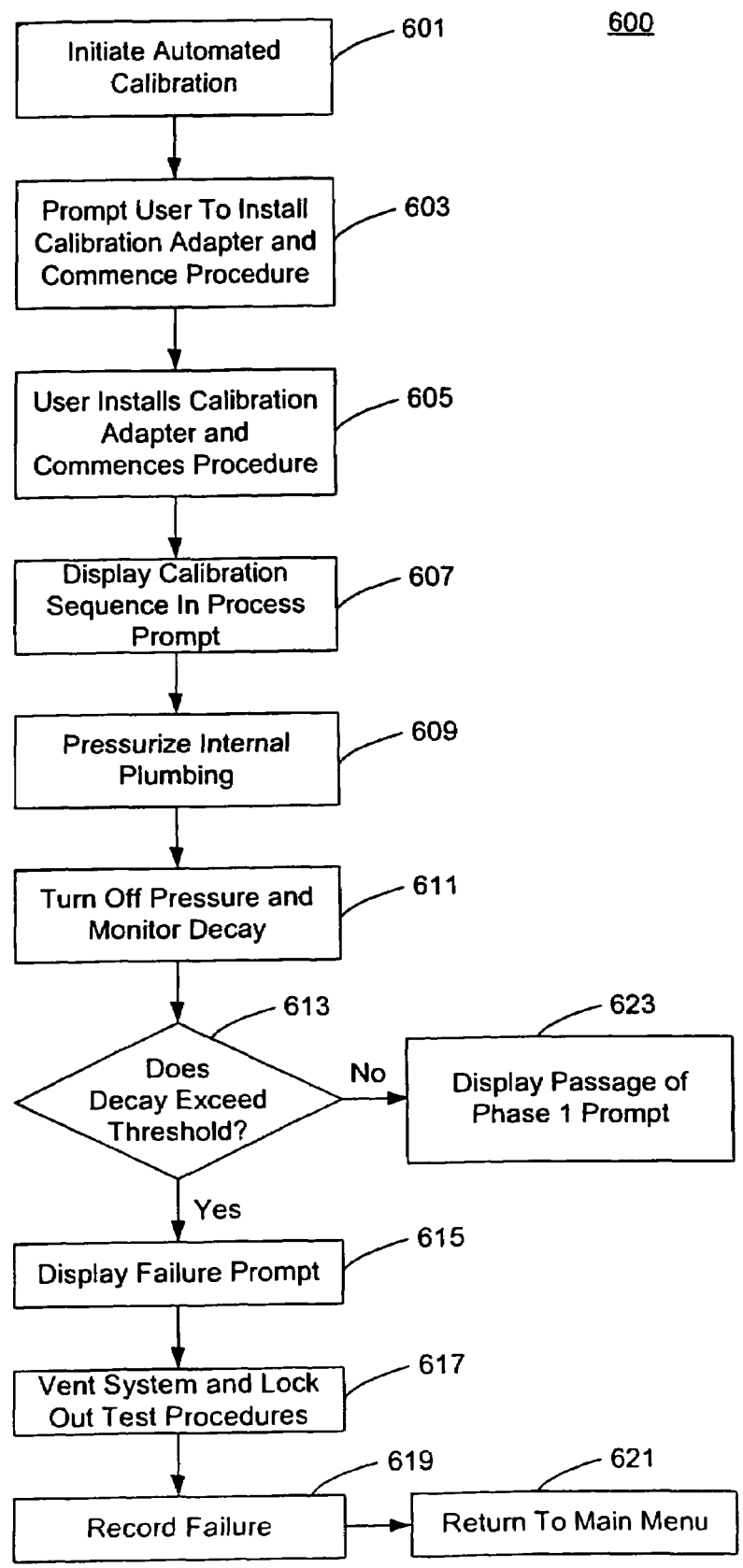
FIG. 6 is an exemplary flow chart of a calibration process, according to an embodiment of the invention.

FIG. 6 illustrates an exemplary process 600, wherein the calibration module of tank tester 101 may test the internal integrity of testing component 117. This may be referred to herein as "phase one" of tank tester 101's calibration procedure. In an operation 601, an event may occur wherein automated calibration of tank tester 101 is initiated. This event may include, the passage of a predetermined amount of time, the completion of a predetermined number of tests, user selection of a calibration mode, or other event. In an operation 603, the display device 111 (FIG. 1) of tank tester 101 may display a prompt such as, for example: "INSTALL CAL. ADAPTOR. PRESS START." As used herein, "prompt" may include any message displayed to a user conveying information regarding tank tester 101. In an operation 605, a user may install a calibration adaptor to plug outlet hose 121 (FIG. 1) of tank tester 101 thus enabling internal pressurization. Also, in an operation 605, the calibration procedure may be commenced by a user, for example, by the user pressing a start button that is operatively connected to computer component 103 (FIG. 1) of tank tester 101. After the calibration procedure is commenced in operation 605, an operation 607 may occur, in which tank tester 101 may display the following prompt: "CALIBRATION SEQUENCE IN PROGRESS." Other prompts conveying a similar message may be used. In an operation 609, tank tester 101 may pressurize its internal plumbing and external hose to 14" $H_2O$. Other pressure thresholds may be used. In an operation 611, the pressurized gas source may be turned off and one or more internal pressure sensors (transducers) may monitor the internal pressure decay.

If, in an operation 613, the system pressure decay exceeds a predetermined decay threshold such as, for example, 1"

H₂O in 60 seconds, tank tester 101 may fail phase one of the calibration test. In an operation 615, tank tester 101 may display a prompt such as, for example: "PHASE ONE CAL FAILED." Other pressure decay levels may be used to determine the failure of phase one calibration. In an operation 617, tank tester 101 may vent any remaining pressure in tank tester 101 to the atmosphere. In operation 617 the calibration module may also lock out tank tester 101 and prevent it from performing other procedures until the calibration procedure has been successfully completed. In an operation 619, the calibration module may write "F" in a Pressure Decay-Phase One Result field of a Calibration Record or otherwise record the failure of phase one of the calibration procedure. In an operation 621, tank tester 101 may display the following prompt: "REMOVE CAL ADAPTOR" and return to the main menu of tank tester 101 (described in detail below). Other prompts conveying similar messages may be used. If, in operation 613, tank tester 101 does not exceed the predetermined pressure decay threshold, and thus successfully completes phase one of the calibration procedure, tank tester 101 may, in an operation 623, indicate passage of phase one by displaying a prompt conveying such a message. In some embodiments, the calibration module may then proceed to phase two of the calibration procedure.

Figure 7:
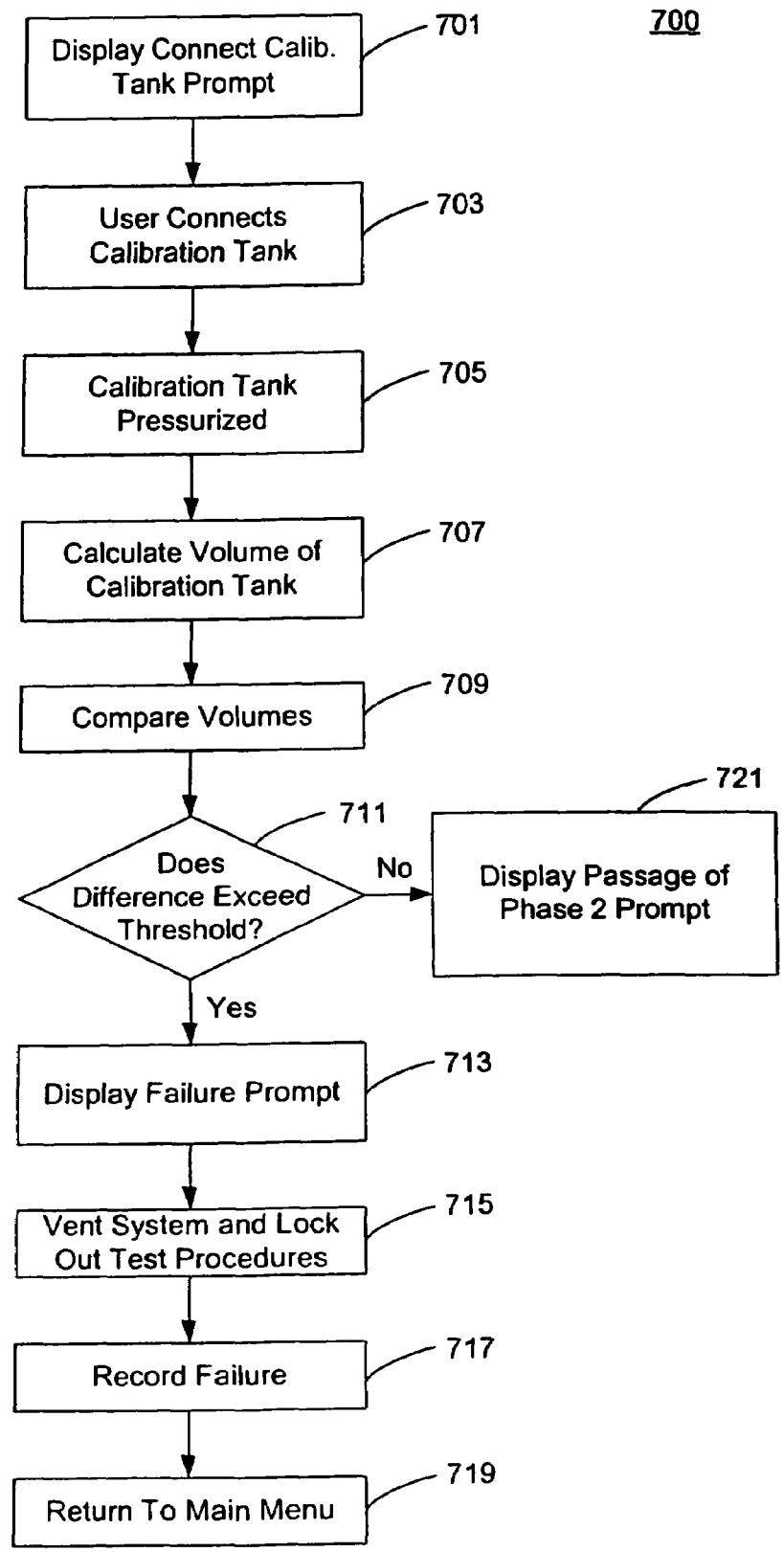
FIG. 7 is an exemplary flow chart of a calibration process, according to an embodiment of the invention.

FIG. 7 illustrates exemplary process 700, in which the calibration module of tank tester 101 may test and/or calibrate tank tester 101's ability to determine the volume of a tank. This may be referred to herein as "phase two" of tank tester 101's calibration procedure and may be triggered by the successful completion of phase one or other event.

In an operation 701, tank tester 101 may display a prompt such as, for example: "CONNECT THE CAL TANK TO THE TESTER. TURN CAL. LEAK SWITCH TO OFF." In an operation 703, a user may connect a calibration tank to tank tester 101. In an operation 705, while compensating for temperature, tank tester 101 may pressurize the calibration tank to a predetermined pressure level such as, for instance, 14" H₂O or other pressure level. Having the exact volume of the calibration tank stored in memory, tank tester 101 may then, in an operation 707, calculate the volume of the calibration tank. In an operation 709, tank tester 101 may then compare the calculated volume of the calibration tank with the calibration tank volume stored in memory. If, in an operation 71 1, the calculated volume differs from the stored volume exceeding a level of ±10% or other benchmark, tank tester 101 may fail phase two of calibration, and in an operation 713, may display a prompt such as, for example: "PHASE TWO CAL FAILED. DISCONNECT TESTER FROM CAL TANK." In an operation 715, tank tester 101 may vent any remaining pressure to the atmosphere and the calibration module may lock out tank tester 101 to prevent further procedures until tank tester 101 successfully passes the calibration procedure. In an operation 717, the calibration module may write "F" in the Vapor Space Calculation—Phase Two Result field of the Calibration Record or otherwise record the failure of phase two calibration. In an operation 719, tank tester 101 may return to the main menu.

If, in an operation 711, the calculated volume the calibration tank does not differ from the stored volume of the calibration tank exceeding exceed a level of ±10% or other benchmark, and thus successfully completes phase two of the calibration procedure, tank tester 101 may, in an operation 721, indicate passage of phase two by displaying a prompt conveying such a message. In some embodiments, the calibration module may then proceed to phase three of the calibration procedure.

Figure 8:
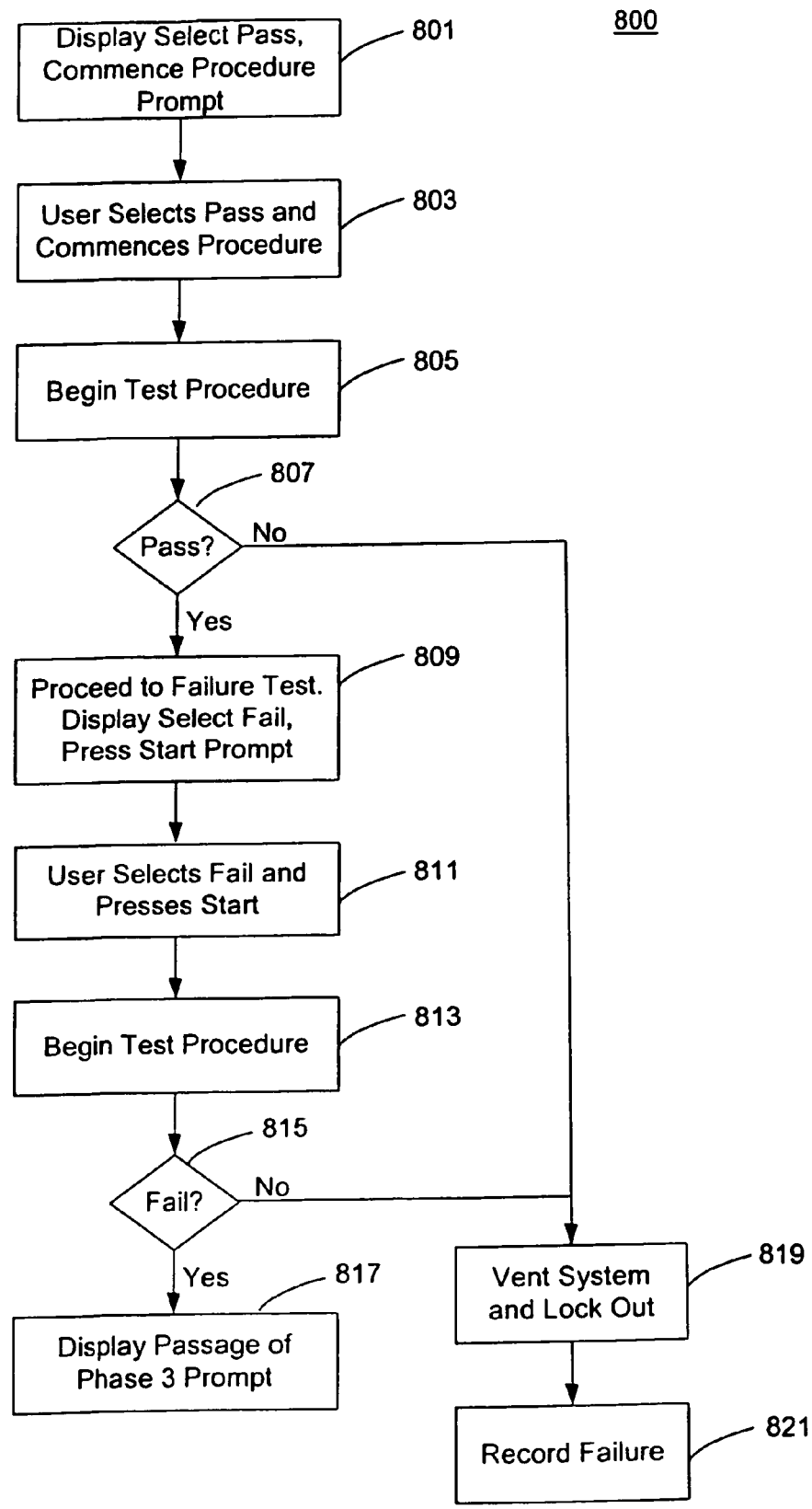
FIG. 8 is an exemplary flow chart of a calibration process, according to an embodiment of the invention.

FIG. 8 illustrates exemplary process 800, in which the calibration module of tank tester 101 may test and/or calibrate tank tester 101's ability to pass and fail tanks according to a particular test. This may be known as "phase three" of tank tester 101's calibration procedure and may be triggered by the successful completion of phase two or other event. In an operation 801, tank tester 101 may display a prompt such as, for example: "SELECT PASS. PRESS START." In an operation 803, a user may select "pass" from a menu and may commence calibration by, for example pressing a start button that is operatively connected to computer component 103 (FIG. 1). In an operation 805, tank tester 101 may undergo a testing procedure such as, for example, a vapor leak test or other testing procedure, using a calibration tank with the goal of simulating a passing test. The integrity of the calibration tank may be such that the calibration tank should pass the test. For example, if the test were a vapor leak test, the calibration tank may be configured such that no leaks (or insubstantial leaks) are present. If, in an operation 807, tank tester 101 determines that the calibration tank passes the test, tank tester 101 may, in an operation 809, proceed to simulate a failed test of the same type. In operation 809, tank tester 101 may display a prompt such as, for example: "SELECT FAIL. PRESS START." In an operation 811, the user may select "fail" from a menu and press the start button or other button to begin the calibration.

In an operation 813, tank tester 101 may again utilize tank tester 101's testing procedure, and tests the calibration tank. In this instance the calibration tank may be configured such that it should fail the test. If, in an operation 815, tank tester 101 fails the test tank, thus passing phase three of the calibration procedure, tank tester 101 may display a prompt such as, for example: "CAL PASSED. DISCONNECT CAL. TANK" in an operation 817.

If, in operation 807, tank tester 101 fails the test or, in an operation 815, tank tester 101 passes the test, and thus fails to properly identify the pass or fail conditions of the calibration procedure, then, in an operation 819 tank tester 101 may vent any remaining pressure to the atmosphere. In operation 819, the calibration module may also lock out tank tester 101 and prevent it from performing procedures or tests until tank tester 101 successfully passes the calibration procedure. In an operation 821, the calibration module may write "F" in the Vapor Space Calculation—Phase Two Result field of the Calibration Record or otherwise record the failure of phase three calibration. In an operation 823, tank tester 101 may return to the main menu and display a prompt such as, for example: "PHASE 3 TESTER CAL FAILED."

In one embodiment, the calibration module may utilize switichable calibrated leak standards. To accomplish this, the calibration tank may contain gaps of different sizes for different standards. The use of these orifices may be controlled automatically upon selection of a particular leak standard. For example, if a 0.020" standard is selected, a 0.016" (pass) and 0.024" (fail) gap may be used in conjunction with a calibration tank for the pass/fail calibration of tank tester 101. If a 0.040" standard is selected, a 0.035" (pass) and 0.045" (fail) gap may be used in conjunction with the calibration tank for the pass/fail calibration of tank tester 101. Other leak standards may be used. Furthermore, if an "Off" position is selected, the calibration tank may be sealed to create a sealed test container.

Upon successful completion of the calibration procedure, the calibration module may write the results to the calibration record with the date and time, and start a timer for the next calibration due date and time. The new record may be recorded to the calibration record. The data recorded in the calibration record regardless of failure or passage may include Station ID (facility conducting test), Tester ID (person conducting test), Calibration ID (the specific calibration iteration), Date/Time of Calibration, Software Version, Pressure Decay for Phase One, Vapor Space calculated for Phase Two, Result of Phase 3, Overall Calibration Result, Calibration Error, Date/Time of Next Calibration Due, or other data. To calculate the next time due, the software may add the predetermined time period to the current calibration date and time.

Figure 9:
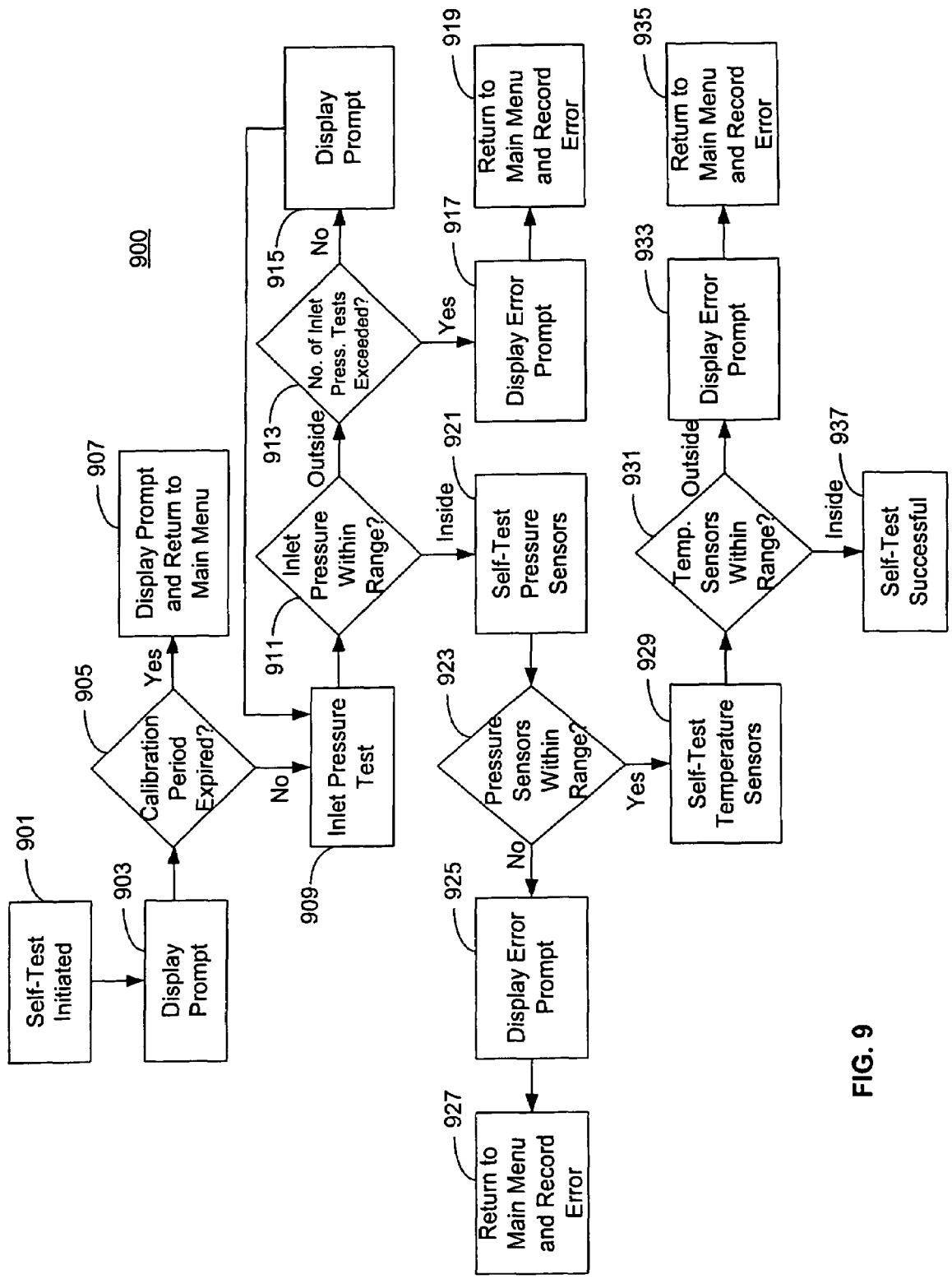
FIG. 9 is an exemplary flow chart of a self-test process, according to an embodiment of the invention.

FIG. 9 illustrates an exemplary process 900, wherein a self-test module of tank tester 101 may perform a self-test. A self-test may occur with a pressurized gas source connected to tank tester 101, and may also occur with applicable outlet vents of tank tester 101 open.

In an operation 901, a self-test may be initiated by, for example, user selection of a self-test, initiation of a substantive tank test, successful completion of other calibration procedures, or other event. In an operation 903, tank tester 101 may display a prompt such as, for example: "SELF TEST—PLEASE WAIT" while the self-test module checks to verify that the calibration period has not expired. If, in an operation 905, a predetermined calibration period has expired, the self-test module may, in an operation 907, display a prompt such as, for example: "CALIBRATION REQUIRED" and return to the main menu.

If, in an operation 905, the predetermined calibration period has not expired, the self-test module may begin a self-test procedure in an operation 909. In operation 909, self-test module may test whether tank tester 101's inlet pressure is within a predetermined range while a known pressure is applied to tank tester 101. If, in an operation 911, inlet pressure falls outside the predetermined range, tank tester 101 may proceed to an operation 913. In operation 913, tank tester 101 may determine the number of times (within the present self-test) that inlet pressure has been self-tested. If a predetermined number of inlet pressure self-tests has not been exceeded, then tank tester 101 may proceed to an operation 915, wherein tank tester 101 may display a prompt such as, for example: "INLET PRESSURE ERROR—CHECK INLET SUPPLY LINE." The self-test module may then return to operation 909 and reinitiate the inlet pressure test. The self test module may then proceed through operations 911 and 913. If, in operation 913, tank tester 101 fails the inlet pressure self-test a second time (or other predetermined number of times), tank tester 101 may, in an operation 917, display a prompt such as, for example: "INLET PRESSURE ERROR, CALL SERVICE." In an operation 919 the self-test module may return to the main menu without setting a lockout and may record the error.

If, in an operation 911, tank tester 101's inlet pressure falls within the predetermined range, then the self-test module may, in an operation 921, proceed to test whether tank tester 101's pressure sensors (transducers) fall within a predetermined range. To make this determination, sensor readings are taken while a known pressure is applied to tank tester 101. If, in an operation 923, the sensors fall outside an expected range, then tank tester 101 may, in an operation 925, display a prompt such as, for example: "SENSOR ERROR—CALL SERVICE." Other prompts conveying similar messages may be used. In an operation, 927, the self-test module may return to the main menu without setting a lockout and may write the error code Pressure Sensor Error to the test record in the Error Code field, or otherwise record the error.

If, in an operation 923, tank tester 101's pressure sensors fall within the predetermined range, the self-test module may proceed, in an operation 929, to test whether tank tester 101's temperature sensors fall within a predetermined range. This determination may be made by taking temperature readings from the temperature sensors while a known temperature is applied to tank tester 101. If, in an operation 931, the temperature sensors fall outside the predetermined range, then tank tester 101 may, in an operation 933, display a prompt such as, for example: "TEMPERATURE SENSOR ERROR—CALL SERVICE." In an operation 935, the self-testing module may return to the Main Menu without setting a lockout and may write the error code Temperature Sensor Error to the test record in the Error Code field or otherwise record the error.

If, in operation 931, temperature sensors fall within the predetermined range, the self-test module may, in an operation 937, determine that the self test has been successfully completed and may display a prompt conveying such a message.

According to an embodiment, the calibration module may perform a system-test for tank tester 101's overpressure function. This system-test monitors for tank tester 101's ability to disable tank tester 101 in the event that over pressurize of a calibration tank or fuel tank occurs. Tank tester 101 may be capable of resuming normal operation after the overpressure condition has been eliminated, and tank tester 101 successfully completes the calibration procedure successfully. Upon failing the system-test, tank tester 101 may prevent further testing with the device for a predetermined period of time, but may allow subsequent attempts to successfully complete calibration procedures, self tests or system tests. Once calibration has been successfully completed, the calibration module may allow testing to occur.

If tank tester 101 fails any portion of a calibration test, a technician may be prompted to perform subsequent calibration procedures or contact a designated service provider for repairs. According to one embodiment, when service of tank tester 101 is required, tank tester 101 may not allow further tank testing or manual mode pressurization to be performed until full function has been restored by an authorized or designated service representative.

Although the calibration procedures described above may have been described as occurring in a particular order ("phase one," "phase two," etc.), it should be understood that the aforementioned calibration procedures, self-test procedures, and system test procedures may be performed in any sequence. Any sequence of calibration procedures, self-test procedures, and system test procedures may be referred to as "calibration."

Testing

Fuel Evaporative Test

Once calibration have been performed, any number of tests, measurements, and/or calculations may be performed. According to an embodiment of the invention, tank tester 101 may include a test module. The test module may enable tank tester 101 to conduct various fuel tank tests such as, for example, a fuel evaporative test. A fuel evaporative test may enable calculation of the size of a leak in a fuel tank of unknown size.

Figure 10:
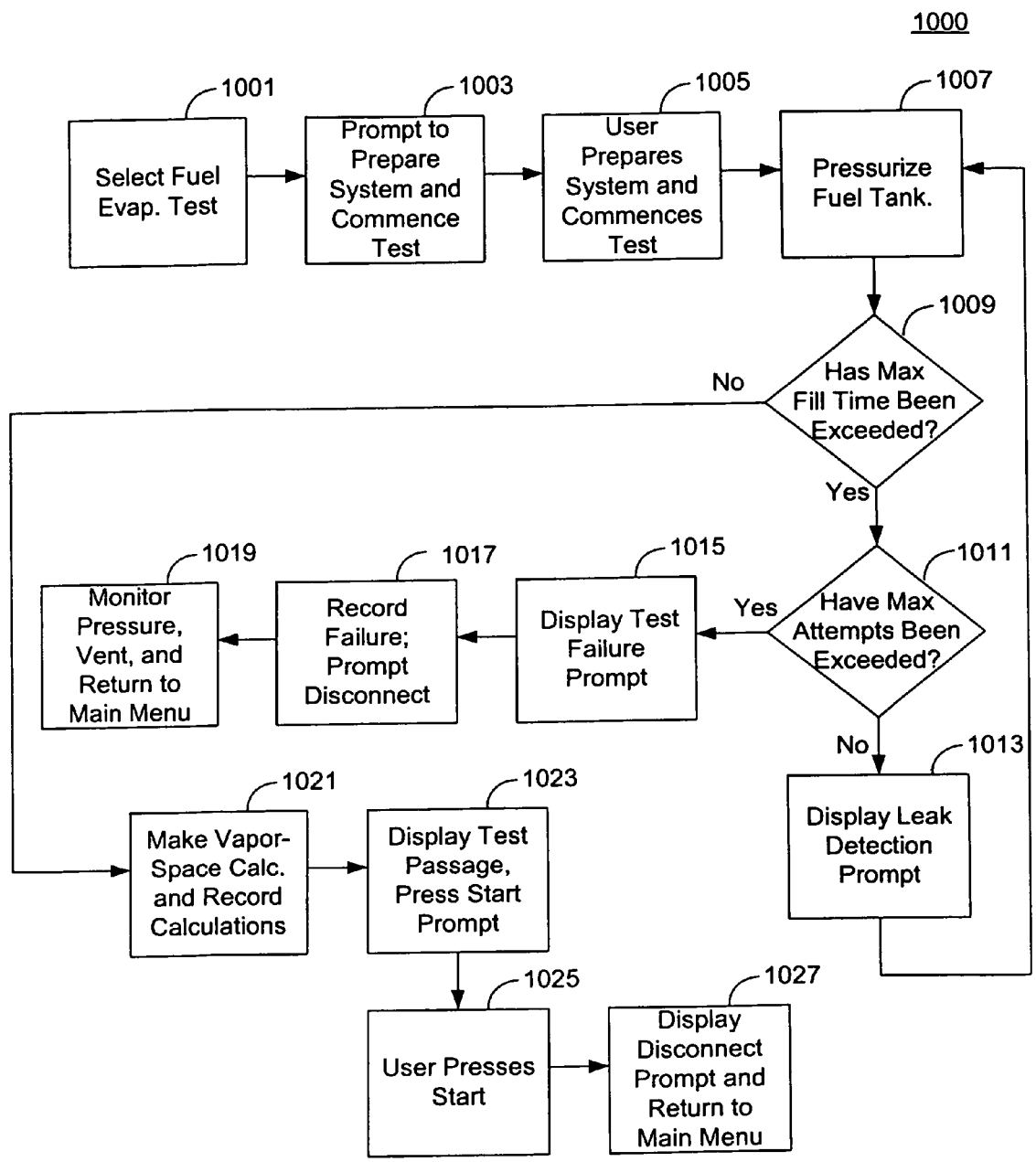
FIG. 10 is an exemplary flow chart of a fuel tank test process, according to an embodiment of the invention.

FIG. 10 illustrates an exemplary process 1000, wherein a test module of tank tester 101 may perform a fuel evaporative test. In an operation 1001, fuel evaporative test may be selected from the main menu or a fuel evaporative test may otherwise be initiated. In an operation 1003, tank tester 101 may display a prompt such as, for example: "CONNECT TO TANK, SEAL EVAP SYSTEM, PRESS START." In an operation 1005, a user may then connect tank tester 101 to a fuel tank to be tested, seal or otherwise prepare all necessary systems, and commence the test. The user may commence the test by, for example, pressing a start button that is operatively connected to computer component 103 (FIG. 1).

In an operation 1007, tank tester 101 may pressurize the fuel tank. During or after pressurization, tank tester 101 may determine if the maximum allowable fill time has been exceeded. For example, a gross leak may be indicated if the fuel tank cannot be pressurized to 5" $H_2O$ in the first 60 seconds of fill time. If, in an operation 1009, the fill time has been exceeded, tank tester 101 may proceed to an operation 1011. In operation 1011, the test module may determine how many times operation 1007 has been performed. If operation 1007 has not been performed more than a predetermined number of times, then tank tester 101 may, in an operation 1013, display a prompt such as, for example: "GROSS LEAK DETECTED. CHECK ALL CONNECTIONS AND PRESS START." The test module may then return to operation 1007 and reinitiate pressurization.

The test module may then proceed through operations 1009 and 1011. If, in operation 1011, operation 1007 has been performed more than the predetermined number of times, the test module may, in an operation 1015, display a prompt such as, for example: "TEST FAILED. TEST COMPLETE." Other prompts conveying similar messages may be used. In an operation 1017, the test module may write a "G" (for "gross leak") to the "Test Result" field of the Test Record or otherwise record the failure and may then display a prompt such as, for example: "UNSEAL EVAP SYSTEM. DISCONNECT TESTER." In an operation 1019, tank tester 101 may monitor the fuel tank pressure for 30 seconds (or other time period) after which, tank tester 101 may vent any remaining pressure from tank tester 101 and may return to the main menu.

If, in an operation 1009, the fuel tank passes the fill-time portion of the test (indicating no gross leak), the test module may, in an operation 1021, determine whether an otherwise unacceptable leak exists in the fuel tank (e.g., pass or fail) and make vapor space calculations. In making such calculations, the test module may compensate for temperature, Reid Vapor Pressure (RVP), and vapor space (described in detail below). Temperature, RVP, and vapor space compensation may be used to ensure accuracy of pressure, volume, and leak measurements.

In operation 1021, the test module may write the ambient temperature to the "Ambient Temp" field of the test record or otherwise record the ambient temperature during the test. In operation 1021, the test module may also write the calculated vapor space results to the "Vapor Space" field of the test record or otherwise record the vapor space results. If the fuel tank passes the test, then, in operation 1021, the test module may write a "P" to the Test Result field of the Test Record or otherwise record passage of the test. In an operation 1023, tank tester 101 may display a prompt such as, for example: "TEST PASSED. PRESS START TO CONTINUE." Similar steps may be taken in the event of fuel tank failure. In an operation 1025 the user may press the start button or otherwise indicate readiness to disengage tank tester 101 from the tested fuel system. In an operation 1027, tank tester 101 may display a prompt such as, for example: "UNSEAL EVAP SYSTEM. DISCONNECT TESTER." If tank tester 101 senses any pressure in the fuel tank 10 seconds (or other predetermined amount of time) after the last prompt, tank tester 101 may automatically vent the remaining pressure from the tank and testing component 117 (FIG. 1) to the atmosphere or other area. In an operation 1027, tank tester 101 may turn to the main menu.

Flow Method

In one embodiment of the invention, the test module of tank tester 101 may perform a fuel evaporative test designed to calculate the size of a hole in a subject tank using a "flow method." In this embodiment, testing component 117 of tank tester 101 may have a "Fast Fill Flow" and "Slow Fill Flow" filling path. Using the Fast Fill Flow path, the subject tank may be pressurized to a predetermined pressure level such as, for example 14" $H_2O$ at a rate of approximately 8.5 standard liters per minute (SLPM). Once the desired pressure is realized, tank tester 101 may switch to the Slow Fill Flow path. The Slow Fill Flow path may have an orifice and precision pressure regulator set to a predetermined pressure level such as, for example, 14" $H_2O$. The pressure regulator attempts to maintain a constant pressure in the subject tank. If the subject tank has no leak, there will be no flow. If the subject tank has a leak, the flow rate of gas required to keep a constant pressure in the subject tank should be the flow rate of the leak. Based on this flow rate, and the pressure in the subject tank, the size of the hole in the subject tank may be calculated and compared to a calibrated standard.

Once a hole size is determined by the flow method, the tank may be allowed to leak down over a certain period of time. Based on the pressure drop in the tank versus time, the volume of the tank may be calculated. If the tank does not have any leaks, the volume may be calculated based on the Fast Fill Flow time and Fast Fill Flow rate.

Constant Flow Test

In another embodiment of the invention, the test module of tank tester 101 may perform a constant flow test. The constant flow test may operate by applying a constant flow of gas to fuel tank 140 which results in a increasing pressure. By measuring the rate at which a pressure corresponding to the pressure in fuel tank 140 increases, a determination is made as to the integrity of fuel tank 140 (or fuel system 150). The pressure inside an un-compromised fuel tank would increase at a greater rate than that of a compromised fuel tank. In some embodiments, the degree to which the fuel tank is compromised may be determined by the rate at which the pressure inside the fuel tank increases.

Leak Down

According one embodiment, the test module may determine the integrity of a fuel tank using a leak down test. In performing a leak down test, tank tester 101 may pressurize fuel tank 140 to a predetermined pressure. Once the predetermined pressure is reached, a time interval may elapse and a pressure corresponding to the pressure in fuel tank 140 is measured. Successive time intervals and pressure measurements may occur. If the pressure in fuel tank 140 remains approximately at the predetermined pressure, fuel tank 140 (or fuel system 150) may not be compromised (e.g., no leaks, or leaks within an accepted tolerance). If the pressure in fuel tank 140 decreases, fuel tank 140 (or fuel system 150) may be comprised (e.g., has a leak). Tank tester 101 may then perform calculations to determine the size of the leak and whether the leak is acceptable (e.g., pass/fail).

Vacuum Testing

In one embodiment, the test module of tank tester 101 may determine the integrity of a fuel tank (or fuel system) using vacuum testing. In one embodiment, vacuum testing may operate by reducing pressure in fuel tank 140 to a predetermined pressure below ambient pressure. Such a predetermined pressure may be achieved by applying a vacuum to fuel system 150. The vacuum may be applied by a suitable device such as, for example, a vacuum pump, or other device known to one skilled in the art. Once the predetermined pressure is reached, a pressure corresponding to the pressure in fuel tank 140 is measured. If the pressure in fuel tank 140 remains at approximately the predetermined pressure, fuel tank 140 (or fuel system 150) may not be compromised (e.g., no leaks, or leaks within an accepted tolerance). If the pressure in fuel tank 140 increases, fuel tank 140 (or fuel system 150) may be comprised (e.g., has a leak). Tank tester 101 may then perform calculations to determine the size of the leak and whether the leak is acceptable (e.g., pass/fail).

In another embodiment, vacuum testing may operate by applying a continuous vacuum to fuel tank 140 which results in a decreasing pressure inside fuel tank 140. By measuring the rate at which a pressure corresponding to the pressure in fuel tank 140 decreases, a determination may be made as to the integrity of fuel tank 140 (or fuel system 150). The pressure inside an uncompromised fuel tank would decrease at a greater rate than that inside a compromised fuel tank. In some embodiments, the degree to which the fuel tank is compromised may be determined by the rate at which the pressure inside the fuel tank decreases.

Mechanical Pressure

Figure 11:
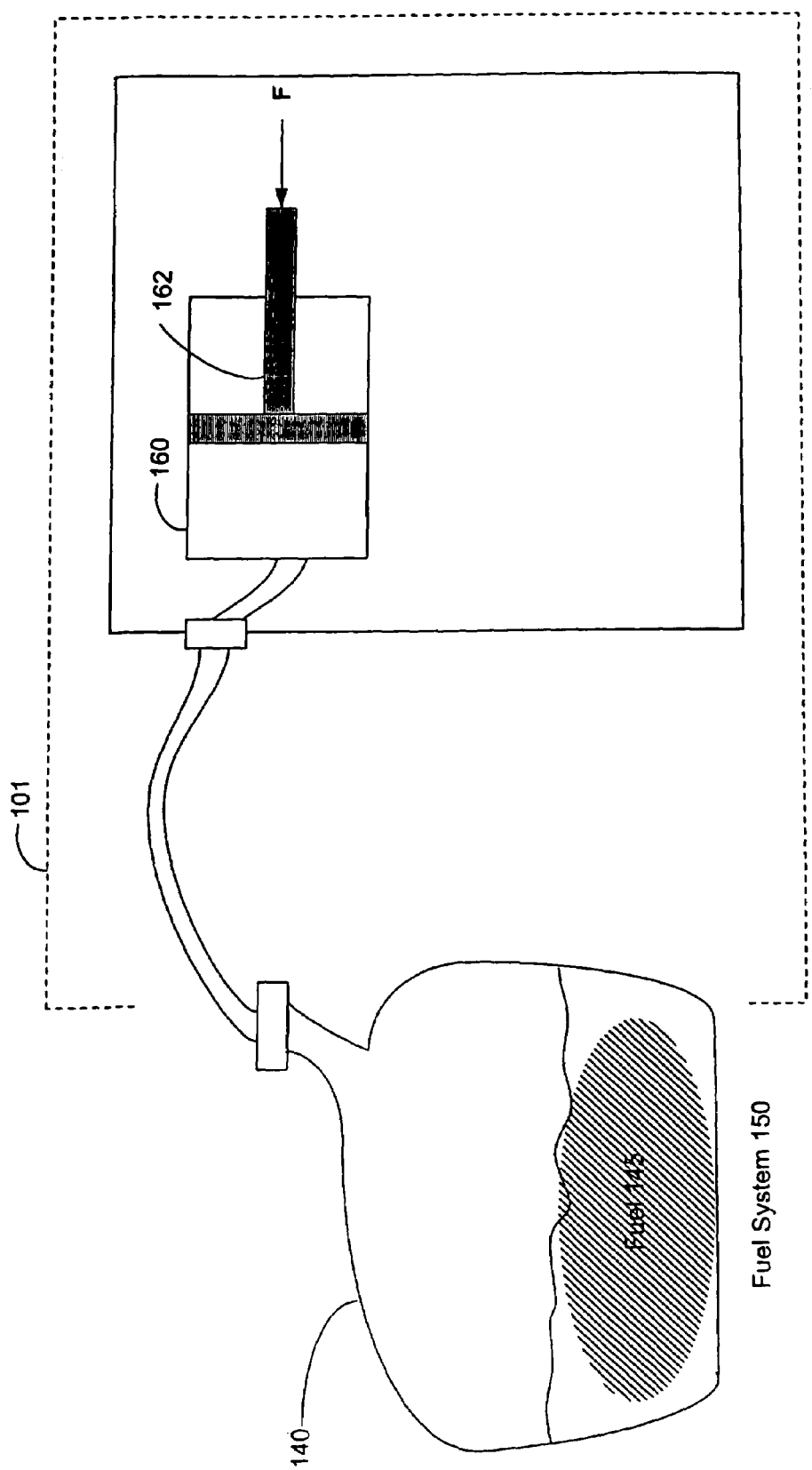
FIG. 11 is a schematic diagram of a tank tester system, according to an embodiment of the invention.

According to one aspect of the invention illustrated in FIG. 11, the test module of a system 1100 may determine the integrity of the fuel tank 140 (or fuel system 150) by applying a constant, predetermined pressure to fuel tank 140 via a mechanical device, such as a piston 162 and cylinder 160. A force may be applied to piston 162 commensurate with the desired predetermined pressure to be applied to fuel tank 150. The force may be applied to piston 162 by an electric or fuel based motor, by a hydraulic device, or by another suitable device known to one skilled in the art. Once the predetermined pressure is reached in the tank, the force applied to piston 162 and the force corresponding to the pressure in fuel tank 140 should be equal and opposite. If fuel system 150 is uncompromised (e.g., no leaks), piston 162 should remain stationary (or nearly so). If fuel system 150 is compromised (e.g., leaks), piston 162 should move. The degree to which piston 162 moves may be related to the degree to which fuel system 150 leaks. The movement of piston 162 in cylinder 160 may be measured via various well known mechanisms.

Manual Mode

Figure 12:
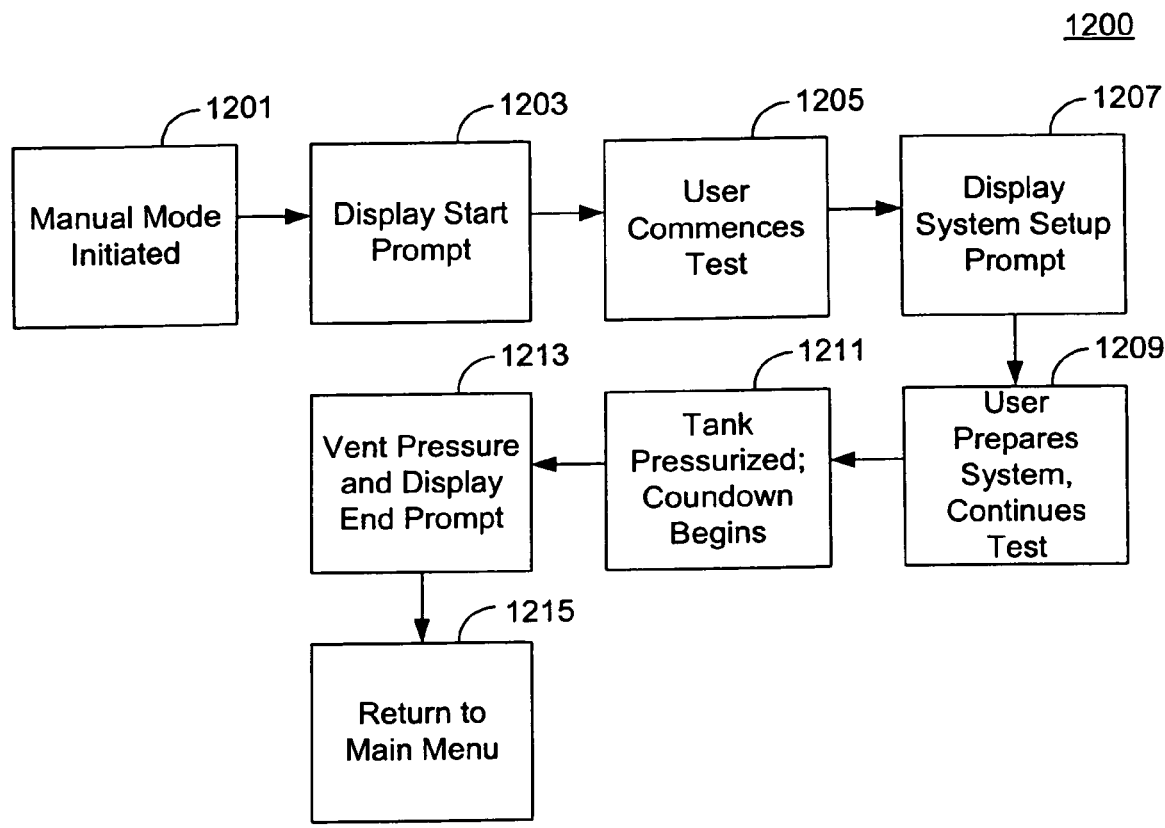
FIG. 12 is an exemplary flow chart of a manual mode test process, according to an embodiment of the invention.

In one embodiment of the invention, tank tester 101 may include a manual-test module. FIG. 12 illustrates an exemplary process 1200, wherein a manual-test module of tank tester 101 may perform manual test sequence. In an operation 1201, manual test mode of tank tester 101 may be initiated. Initiation may occur upon selection by a user or by other event. In an operation 1203, tank tester 101 may display a prompt such as, for example: "PRESS START TO BEGIN TEST." In an operation 1205, a user may commence the test by, for example, pressing a start button that is operatively connected to computer component 103 (FIG. 1). In an operation 1207 tank tester 101 may display a prompt such as, for example: "SEAL EVAP SYSTEM. CONNECT TO TANK. PRESS START." In an operation 1209, a user may connect tank tester 101 to a fuel tank, prepare the system, and continue the test by, for example, pressing the start button. In an operation 1211, tank tester 101 may pressurize the fuel tank to 14" of $H_2O$ (or other predetermined pressure level) and maintain that pressure for no more than 10 minutes or other predetermined amount of time. While in the Manual Mode operation, tank tester 101 may display the following prompt: "MANUAL MODE. TIME REMAINING: XX." The "XX" may represent the time remaining on the predetermined amount of time and may count down as the timer elapses. If the user re-initiates the test cycle by, for example, pressing the start button prior to the expiration of the predetermined time limit, tank tester 101 may restart the timer and continue to pressurize the fuel evaporative system. This process may be repeated until either the timer expires or the user aborts the test by, for example, pressing an abort button that is operatively connected to computer component 103. During pressurization, a user may take readings from the various sensors and transducers of tank tester 101 for use in determining the various qualities of a fuel tank being tested. At the end of the predetermined time period, in an operation 1213, tank tester 101 may vent any remaining tank pressure and display a prompt such as, for example: "TEST COMPLETE. UNSEAL EVAP SYSTEM. DISCONNECT TESTER." In an operation 1215, the manual-test module may return to the main menu.

If at anytime during the manual mode sequence the testing pressure applied to the fuel tank exceeds 28" $H_2O$ (or other predetermined pressure level), tank tester 101 may automatically abort the manual operation, open the pressure vent, and display a prompt such as, for example: "SYSTEM OVERPRESSURE. TEST ABORTED. UNSEAL EVAP SYSTEM. DISCONNECT TESTER." Tank tester 101 may subsequently lock out the fuel evaporative test and manual mode operation until a successful calibration has been completed and return to a main menu.

Additional Components

In some embodiments, tank tester 101 may also include one or more devices (e.g., pliers/clamps) capable of pinching an outlet hose or other pneumatic conduit to completely block vapor flow. These devices may be used during various testing or calibration procedures to block gas flow through tank tester 101. The devices may apply sufficient pressure to substantially completely block any flow while also leaving the conduit undamaged and serviceable. In addition, the devices may be self-locking and capable of performing approximately 5,000 clamping cycles.

In one embodiment, tank tester 101 may also include tapered hose plugs that may plug vapor hose openings in the event that the aforementioned pinching devices are incompatible with the vehicle being tested. These hose plugs may be configured to fit ⅛ to ½ inch inner diameter hose in ⅛-inch increments. Other configurations may be used. In lieu of specially designed plugs, a set of plugs manufactured by Thexton, Part Number 312, or equivalent may be substituted.

In one embodiment, tank tester 101 may also include a calibration adaptor designed to plug the end of tank tester 101's hose (that normally connects to a tank adaptor). This adaptor may be used to plug tank tester 101's hose end during certain calibration procedures as described above.

Multiple Standards

In one embodiment, the test module may enable the use of different predefined standards for fuel tank tests. For example, the test module may base a pass/fail determination on a standard on a 0.020" gap. Where a fuel evaporative system leak is less than or equal to a 0.020" diameter gap, the test module may return a pass determination. Accordingly, the test module may fail the fuel evaporative system where the leak exceeds a 0.020" diameter gap.

Under a different standard such as, for instance, a 0.040" diameter orifice standard, the test module may pass a vehicle where the fuel evaporative system leak is less than or equal to a 0.040" diameter gap, and fail the fuel evaporative system where the leak exceeds a 0.040" diameter gap. The false pass error rate may be less than ±5% and the false fail error rate may be less than ±1%. Other pass/fail standards and error rates may be used. All data pertinent to test standards may be stored in a file. This file may include any or all data and/or algorithms required to make the Pass/Fail decision in tank tester 101.

Calculations and Compensation

According to one aspect of the invention, tank tester 101 may contain a data analysis module. The data analysis module may, among other things, measure vapor space, temperature, and Reid Vapor Pressure (RVP) within a fuel tank being tested and may compensate for these factors when making test calculations.

Temperature measurements may be taken by one or more temperature sensors included in tank tester 101. The temperature sensors may be placed in various places within the testing component and may be connected to a sensor or other element of computer component 103. Additionally, various hardware and software components associated with tank tester 101 may be used to determine liquid fuel temperature based on measured vapor temperature. These temperature readings may be used in the calculations made during the various tests performed by tank tester 101.

Tank tester 101 may include a barometric pressure sensor for measuring the barometric pressure of the testing environment in which tank tester 101 is being used. Tank tester 101 may also include an ambient temperature sensor for measuring the ambient temperature of the testing environment. These measurements may also be used in the calculations performed by tank tester 101.

Referring back to FIG. 1, Reid Vapor Pressure (RVP) measurements may be taken for a volume of fuel 145 in fuel tank 140. RVP corresponds to the pressure induced in a closed volume (fuel tank 140) as a result of the evaporation of liquid (fuel 145) in the closed volume. To improve the accuracy of tank tester 101, the data analysis module may compensate for RVP. In order to compute RVP, the data analysis module may obtain the following measurements or quantities: the volume of fuel tank 140, the volume of the liquid (fuel 145) in fuel tank 140, a measure of the liquid's tendency to evaporate, and the ambient temperature of the surrounding environment. With one or more of these variables, the amount of pressure induced by the evaporative effects of the fuel 145 may be determined.

In some embodiments of the invention, RVP may be measured directly by, for instance, releasing the pressure in fuel tank 140, resealing fuel tank 140, allowing the closed system to reach a steady state condition, and measuring RVP at steady state. Once RVP is determined, the data analysis module may compensate for RVP in pressure measurements as would be apparent.

In some embodiments, certain other measurements such as, for example the volume of fuel tank 140, the volume of fuel 145 in fuel tank 140, the volume of vapor in fuel tank 140, or other measurements may be used by tank tester 101 in making calculations. In some embodiments, the volume of fuel tank 140 may be provided by the manufacturer of fuel tank 140 or integrator of fuel system 150 (e.g., automobile manufacturer). In other embodiments of the invention, the volume of fuel tank 140 may be measured. In some embodiments of the invention, the volume of fuel 145 in a fuel tank 140 may be measured. In other embodiments, fuel tank 140 may be drained and a known volume of fuel 145 may be dispensed into fuel tank 140. In some embodiments, the volume of fuel tank 140 and the volume of fuel 145 may be used to determine the volume of vapor within fuel tank 140. In other embodiments, the volume of the vapor may be measured directly without obtaining the volume of fuel tank 140 and/or the volume of the fuel 145.

Safety Measures

According to an embodiment of the invention, tank tester 101 may be configured to determine an overpressure condition for either an incoming supply pressure or a regulated test pressure. If at anytime during a procedure (for example, a fuel evaporative test or manual mode test) the tester inlet pressure from the air pressure regulator exceeds 35 psi (or other predetermined value), tank tester 101 may cease any test or procedure in progress. Tank tester software may prevent tank tester 101 from performing a pressurization of the fuel tank until any overpressure condition has been corrected.

Additionally, if at anytime during a procedure the fuel tank pressure exceeds 28" $H_2O$ (or other predetermined pressure level) as measured by tank tester 101, tank tester 101 may open one or more valves and vent any remaining pressure in the fuel tank. Tank tester 101 may also prevent pressurization of the fuel tank for any procedure until the problem has been corrected.

At anytime during a test sequence, the test may be aborted by the activation of an abort button that is operatively connected to computer component 103 (FIG. 1). The abort button may cause tank tester 101 to immediately open a system relief valve, write the "Tech. Abort" code to the Error field of the Test Record (or otherwise record the aborted test), and subsequently return tank tester 101 to the main menu.

Software Updates

A tank tester 101 may include a software update module. The software update module may enable software associated with tank tester 101 (including the operating application and various software modules) to be updated in a number of ways.

Software associated with tank tester 101 may be updated by a modem. For example, a built-in modem may dial a 1-800 number, allow a query of tank tester 101 for the software version, and update software modules and databases as required. In another embodiment, tank tester 101 may be connected to a phone line and a host may call tank tester 101 to commence an update process.

In yet another embodiment, software may be updated using a compact flash card or other memory storage device within tank tester 101. Such a device may be removed from tank tester 101, sent to a service provider for reprogramming, and reintroduced into tank tester 101 with updated software. Alternatively, memory storage devices containing updated software may be sent to tank tester users as replacements for older devices.

In another embodiment, software may be updated by connecting tank tester 101 to a personal computer (or other computer). A user may then connect to the Internet (or other designated network) and link to a provider web page to download software updates. These updates may then be communicated to (and/or stored within) tank tester 101. Alternatively, tank tester 101 may contain sufficient computer hardware and/or software to connect to the Internet or other network without the aid of an additional computer.

Menus

In one embodiment, tank tester 101 may include a main menu. In various embodiments, any one or more of the following menu options may be displayed in the main menu or other menus and may be facilitated by tank tester 101's software and/or hardware: (1) Fuel Evaporative Test, (2) Diagnostic Manual Mode testing, (3) Calibration, (4) Self-test, (4) Status Mode, (5) Software update, (6) Service mode, (7) QA State Menu, or other options.

In one embodiment, a Status Mode may display the following information: testing station's license number (or other testing station identification); next test record number; tester number; date/time; loaded software version number; update software version number; and tester lock out reason.

The testing station license number of an entity using tank tester 101 may include a license number issued by a state automotive authority or other authority. Other station identification may be used. Station identification may be entered into tank tester 101 during initial operation or startup. In one embodiment, station identification may consist of eight characters. In one embodiment, the first two characters of the identification number may be alphas followed by six digits. Other identification number formats may be used.

Tank tester 101 may assign each test a consecutive number (test record number). The number may be written in a Test Record Number field of the test record or otherwise recorded. In one embodiment, this field may be numeric and have a length of six digits. Furthermore, each tank tester 101 may have a unique serial number which may be recorded in the test record.

Using an internal clock, tank tester 101 may assign a date/time stamp to each valid test. A valid test may, in certain embodiments, consist of a completed fuel evaporative test with a pass/fail result recorded to the test record. The time may also change to coincide with changes from standard time in a particular time zone to daylight savings time. In addition, tank tester 101 may compensate for leap year. In one embodiment, the date and time may be formatted as follows: mmddyyyy$_{13}$hhmm. The hour stamp may use the 24-hour clock format. The date/time may be written to the Test Date/Time field of the test record or otherwise recorded.

The loaded software version number may contain the version number in current use by tank tester 101. The loaded software version number may be written to the Loaded Software Version Number field of the test record or otherwise recorded. This field may be populated in the test record for every valid test.

The update software version number may contain the version number of update software that is currently loaded but not being used by tank tester 101. The update software version number may be recorded into a field of the test record. This field of the test record may be populated if tank tester 101 has update software loaded. At a predetermined date, the software of tank tester 101 may be updated, and the old software may be discarded. After the update software version turns into the loaded software version, the update software version number field may be blank.

If tank tester 101 has been locked out, then one of the following reasons (or other reasons) may be displayed on the status page: clock failure, sensor failure, QA/State tester lock-out, or calibration failure.

In one embodiment, a QA State Menu may provide access to certain data stored on tank tester 101. The QA State Menu may be accessed via tank tester 101's display device and user input device, a separate computer (such as a laptop), or other device. The QA State Menu may require a password. In one embodiment, the password may consist of a six character, case sensitive alphanumeric and may change daily. The access code algorithm may be supplied by a service provider or system administrator. Other configurations may be implemented.

The QA State Menu may consist of a menu including one or more of the following options: update config. tables, load software update, download test records, download calibration records, lock-out tester, or other options.

Figure 13:
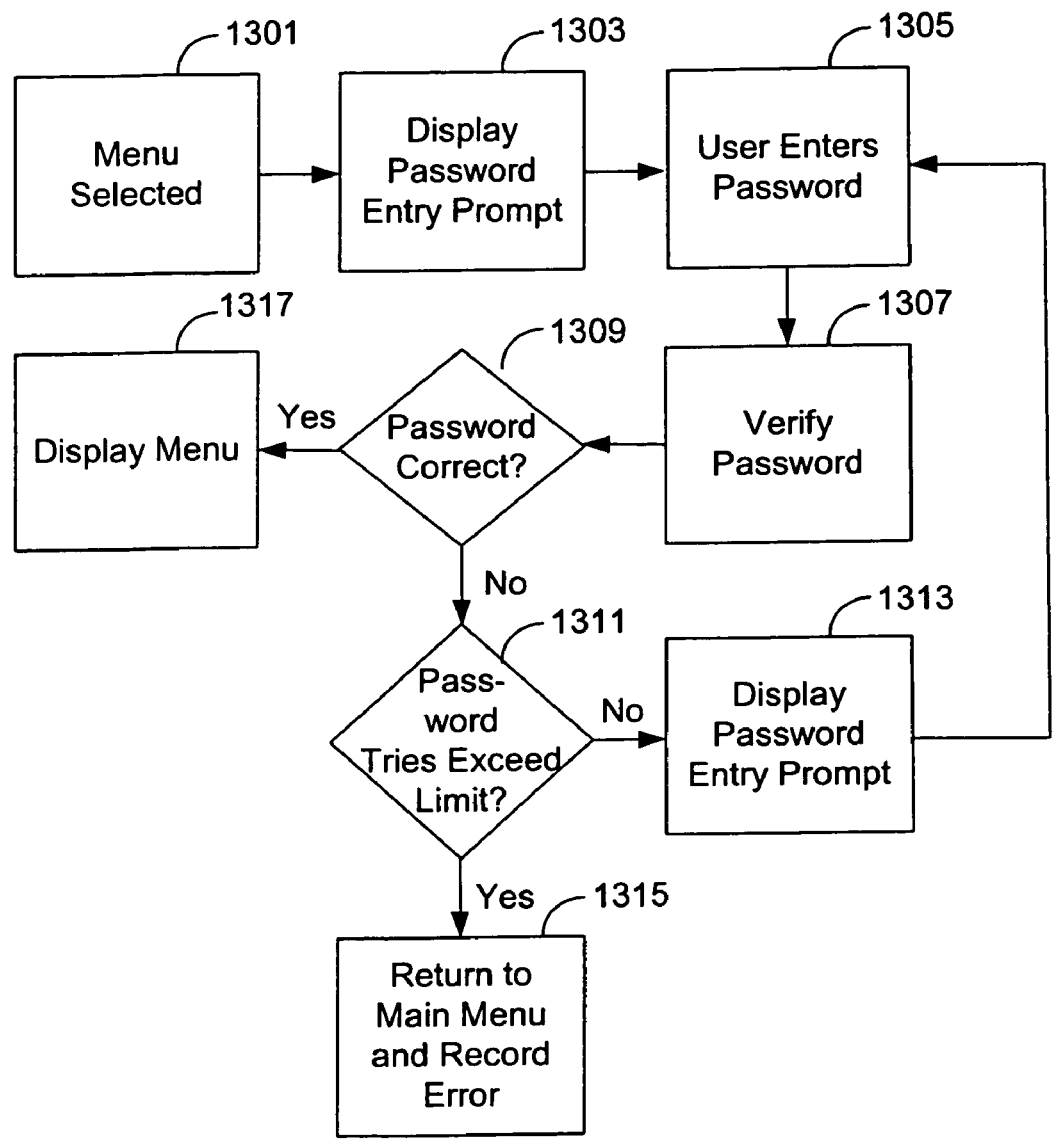
FIG. 13 is an exemplary flow chart of a password protection process, according to an embodiment of the invention.

FIG. 13 illustrates an exemplary process 1300, wherein the QA State Menu (or other password protected area) of tank tester 101 may be accessed. In an operation 1301, the QA State Menu may be selected. In an operation 1303, tank tester 101 may display a prompt such as, for example: "ENTER PASSWORD." In an operation 1305, a user may enter a password. While entering the password, tank tester 101's display device may display only X's or other indicators on the screen. In an operation 1307, a password protection module may verify the password. If, in an operation 1309, the password is incorrect, the software may proceed to an operation 1311. In an operation 1311, the password protection module may determine if the number of times a password has been entered ("password try") exceeds a predetermined allowable number. If, in an operation 1311, the number of password tries does not exceed the allowable number, tank tester 101 may, in an operation 1313 display a prompt such as, for example: "PASSWORD INCORRECT. REENTER PASSWORD." The password protection module may then return to operation 1305 wherein the user may enter a password. The password protection module may proceed through operations 1307, 1309, and 1311. If, in an operation 1311, the number of password tries exceed the allowable number, the password protection module may, in an operation 1315, return to the main menu and record a password error to the test record or otherwise record the error. In operation 1315 the password protection module may also record the date and time of the error to the test record.

If, in operation 1309, the password is correct, then the password protection module may (in an operation 1317) display the QA State Menu which may contain one or more of the following options: update config. tables, load software update, download test records, download calibration records, lock-out tester, or other option. In some embodiments, the QA State Menu, or other menu, may enable update of tank tester 101's internal clock.

The password protection module is described above for use in conjunction with the QA State Menu. The password protection module may, however, be used to provide password protection to any menu or feature of the invention described herein.

If the update config. tables option is selected form the QA State Menu, the software update module may enable the update of the testing parameter in a Config. Table (or other location) as necessary to improve accuracy or compliance with mandated guidelines. If the load software update option is selected, a connected computer may communicate with tank tester 101 to load an updated software version into tank tester 101's memory for activation at a later date. If the download test records option is selected, a user may access test records and download some or all records to a connected computer. The download may be stored in a unique file on the connected computer identified by Tester ID and Station ID. The process may not delete any records from tank tester 101. If the download calibration records option is selected, a user may access a calibration record and download all records to a connected computer. The download may be stored in a unique file on the connected computer identified by Tester ID and Station ID. The process may not delete any records from tank tester 101. If the lockout tester option is selected, a user may send a lock out code to tank tester 101 that prevents tank tester 101 from performing tests or other procedures. In one embodiment, calibration and or self-tests may not be locked out by selection of the tester lockout option.

Test Record

According to an embodiment, tank tester 101 may record test results and related data to a test record. The test record may include multiple fields containing various types of test data such as, for example test start year, test start month, test start day, test start hour, test start minute, test start second, vehicle year, vehicle make, vehicle model, head space, ambient temp, pressure increase/decrease, test result (pass, fail, abort, etc), abort code, date of last calibration, software version number, and/or other data.

According to an embodiment, a test record may be read from tank tester 101 by sending a command with four data bytes in the range of 0000 to 9999 (or other range). Tank tester 101 may respond with the data for the selected tank test results as follows:

<STX><echoed command><command data (status bytes)

XXXXrr . . . rr><chesksum><ETX>

→where XXXX is the record number (as requested)
→rr . . . rr is the test record data (see above) or all zeros if no such record has been collected Other processing alternatives may be implemented.

System Communications

According to an embodiment, tank tester 101 may include a communications module. The communications module may enable standard RS232 communications protocols that may be used for communication between an EIS and tank tester 101. In addition, a laptop computer (or other suitable device) using RS232 communications may be used for software and table updates for tank tester 101. Communications protocols as used herein may enable users to perform one or more various functions including, for example: updating operating software as deemed necessary; updating tables for pass/fail standards; downloading test data from records stored in tank tester 101; downloading tester calibration records stored in tank tester 101; outputting pass/fail results to the EIS; communication with other computers or a network; or other function. Furthermore, the communications module may perform updates and other communications using a modem incorporated into tank tester 101. Protocols other than RS232 may be used.

According to an embodiment, tank tester 101 may include a serial mode module for serial mode operation. Serial mode operation may be two-fold. A first serial mode operation may be for checkout and testing of production line tank testers and repair of returned tank testers. A second serial mode operation may be for integrating communication to EIS equipment. The configuration of the serial port may, for instance, have a baud rate fixed at 9600 baud. Other signaling rates may be used.

According to an embodiment, when connected to and communicating with an EIS, tank tester 101 may be powered by a 12 VDC source limited to 0.5 amps supplied by the RS 232 communications port. Other configurations may be implemented. Alternatively, tank tester 101 may be integrated with an EIS.

According to an embodiment, a service mode may also be provided. The development/service mode may run an evaporative test and show current pressure, temperature and flow readings during the test and show results after the test is finished. The service mode may also run a manual service and test mode while displaying sensor readings solenoid or valve status. Furthermore, the development mode may allow the update of software, databases and tables in conjunction with or apart from other features described herein.

Interlocking Tank Adaptor Safety Mechanism.

According to embodiment, the tank adaptor of tank tester 101 (e.g., tank adaptor 415 in FIG. 4 or tank adaptor 519 of FIG. 5) may provide a closed system between fuel system 150 and tank tester 101. In some embodiments of the invention, tank adaptor 121 may enable tank tester 101 to pressurize fuel system 150, among other things.

One drawback associated with pressurizing fuel system 150 may arise in the event that fuel tank 140 is full, or nearly so, of fuel 145. If the pressure is not properly released, some fuel 145 may spill or splash out of the tank. According to one aspect of the invention, tank tester 101 may include an interlock that prevents fuel from spilling, splashing or other being released from fuel system 150 when it is depressurized. This may be accomplished either at or proximate to tank adaptor 121 alone or in conjunction with various functionality incorporated into tank tester 101.

In some embodiments of the invention, tank adaptor 121 may be unable to be physically removed from fuel neck 143 until pressure inside fuel tank 140 returns to ambient pressure. In some embodiments, tank adaptor 121 may incorporate or otherwise operate with an interlock that prevents tank adaptor 121 from being removed from fuel neck 143 until the pressure returns to ambient pressure (i.e., the pressure of the testing environment).

In some embodiments, tank adaptor 121 may include a valve (e.g., bleed valve, etc.) that releases the pressure in fuel system 150. In some embodiments, tank tester 101 may include the valve (such as the relief valves described in FIGS. 4 and 5). Other embodiments may incorporate the valve elsewhere as would be apparent. In some embodiments, tank tester 101 may include an automated valve that controls the return of ambient pressure to fuel tank 140.

In one embodiment, a kit containing various tank adaptors may be provided with tank tester 101. These adaptors may be designed to fit a majority of vehicles' fuel tank filler necks. In case none of the adaptors fit, a universal tank adaptor may be provided. These adaptors may be made using materials that may be pliable and impermeable to all gasoline constituents. These adaptors may also be made using non-conductive material to prevent sparks.

Hydrocarbon Detector

According to one aspect of the invention, tank tester 101 may contain various mechanical components, hardware components, and/or software components (or modules, such as a hydrocarbon detection module) that may enable tank tester 101 to detect fuel vapor that escapes from fuel system 150. To facilitate fuel vapor detection, a small amount of pressure above ambient pressure may be applied to fuel system 150. This pressure may tend to force any fuel vapor out of a compromised fuel system 150. Such fuel vapor may be detected by a detector incorporated into tank tester 101 such as, for example, a gas analyzer or other detector capable of detecting hydrocarbons. In addition to detecting whether fuel vapor may be leaking from fuel system 150, the detector may also be used to determine the approximate location of the leak by, for example, using a probe from the detector to identify areas with increased levels of hydrocarbons. Devices suitable for hydrocarbon detection are known to those skilled in the art.

Integrated Fuel Cap and Fuel Tank Testing

Currently, tank integrity and fuel cap tests may be performed separately. According to one aspect of the invention, tank tester 101 may be modified to contain sufficient devices, as well as computer hardware and/or software to enable simultaneous measurement of fuel cap leakage and fuel tank integrity.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for testing the integrity of a fuel tank, comprising:

pressurizing a fuel tank at a first predetermined pressurization rate to a predetermined pressure level; and calculating the size of a leak in the fuel tank by:

(i) maintaining the predetermined pressure level in the fuel tank by applying pressure to the fuel tank at a second predetermined pressurization rate if a pressure in the fuel tank drops below the predetermined pressure level; and (ii) measuring an amount of gas introduced to the fuel tank at the second predetermined pressurization rate, wherein the size of a leak is proportional to the amount of gas introduced to the fuel tank at the second predetermined pressurization rate.

* * * * *